United States Patent
Zmijewski et al.

(10) Patent No.: US 11,093,802 B2
(45) Date of Patent: Aug. 17, 2021

(54) METHOD AND APPARATUS FOR CATEGORIZING IMAGES OF MOBILE DEVICE SOFTWARE

(71) Applicant: IRON GAMING LIMITED, Swatar (MT)

(72) Inventors: Peter Marek Zmijewski, Singapore (SG); Scott Matthew Dowdell, Singapore (SG)

(73) Assignee: IRON GAMING LIMITED, Swatar (MT)

( * ) Notice: Subject to any disclaimer, the term of this patent is extended or adjusted under 35 U.S.C. 154(b) by 236 days.

(21) Appl. No.: 16/334,992

(22) PCT Filed: Jul. 20, 2018

(86) PCT No.: PCT/SG2018/050357
§ 371 (c)(1),
(2) Date: Mar. 20, 2019

(87) PCT Pub. No.: WO2020/018014
PCT Pub. Date: Jan. 23, 2020

(65) Prior Publication Data
US 2020/0143197 A1    May 7, 2020

(51) Int. Cl.
*G06K 9/62* (2006.01)
*A63F 13/537* (2014.01)
(Continued)

(52) U.S. Cl.
CPC ............ *G06K 9/628* (2013.01); *A63F 13/525* (2014.09); *A63F 13/5252* (2014.09);
(Continued)

(58) Field of Classification Search
CPC ........ G06N 3/08; G06K 9/6254; A63F 13/92; A63F 13/87; A63F 13/86; A63F 13/798; A63F 13/537; A63F 13/5252
See application file for complete search history.

(56) References Cited

U.S. PATENT DOCUMENTS
2015/0105153 A1    4/2015  Xu

FOREIGN PATENT DOCUMENTS
CN     107016356 A      8/2017
WO     2019/032045 A1   2/2019

OTHER PUBLICATIONS

PCT, Intellectual Property Office of Singapore (ISA/SG), International Search Report, International Application No. PCT/SG2018/050357, 4 pages, dated Oct. 12, 2018.
(Continued)

*Primary Examiner* — Reginald A Renwick
(74) *Attorney, Agent, or Firm* — Thompson Hine LLP

(57) ABSTRACT

A method and apparatus for categorising images of mobile device software, the method comprising: running mobile device software through a platform installed on a user device; capturing images of the mobile device software during user operation; extracting image descriptors from the captured images; processing the extracted image descriptors to generate input to a model derived from a trained computer neural network; processing output of the model to determine a category for a captured image from which the image descriptors are extracted; extracting one or more features present in the captured image according to the predetermined one or more features to be extracted for the category; and processing the extracted one or more features to determine a score, ranking or level tied to the user against scores,
(Continued)

rankings or levels of other users of the same mobile device software in case that the category relates to scoring, ranking or levelling.

32 Claims, 20 Drawing Sheets

(51) Int. Cl.
    *A63F 13/798*    (2014.01)
    *G06N 3/08*    (2006.01)
    *A63F 13/5252*    (2014.01)
    *A63F 13/86*    (2014.01)
    *A63F 13/87*    (2014.01)
    *A63F 13/92*    (2014.01)
    *A63F 13/525*    (2014.01)

(52) U.S. Cl.
    CPC .......... *A63F 13/537* (2014.09); *A63F 13/798* (2014.09); *A63F 13/86* (2014.09); *A63F 13/87* (2014.09); *A63F 13/92* (2014.09); *G06K 9/6254* (2013.01); *G06N 3/08* (2013.01)

(56) References Cited

OTHER PUBLICATIONS

PCT, Intellectual Property Office of Singapore (ISA/SG), Written Opinion of the International Searching Authority, International Application No. PCT/SG2018/050357, 6 pages, dated Oct. 12, 2018.

AI for Chrome Offline Dinosaur Game, http://cs229.stanford.edu/proj2016/report/KeZhaoWei-AIForChromeOfflineDinosaurGame-report.pdf,5 pages, May 6, 2017.

Cheng, W., Master Thesis entitled "Research on Mobile Games Software Automated Testing Based Machine Learning," Zhejiang University Masters Thesis, 69 pages, Sep. 30, 2014.

Cheng, W., English Translation of Master Thesis entitled "Research on Mobile Games Software Automated Testing Based Machine Learning," Zhejiang University Masters Thesis, 98 pages, Sep. 30, 2014.

Kunanusont, K. et al., "General Video Game AI: Learning from Screen Capture," Proceedings of the IEEE Conference on Evolutionary Computation, 8 pages, Apr. 23, 2017.

METHOD AND APPARATUS FOR CATEGORIZING IMAGES OF MOBILE DEVICE SOFTWARE

FIELD OF THE INVENTION

The present invention relates to a method and an apparatus for categorising images of mobile device software, in particular, to facilitate, for example, determination of a state to troubleshoot the mobile device software, and/or determination of a score, ranking or level tied to a user of the mobile device software against scores, rankings or level of other users of the same mobile device software.

BACKGROUND

It has been observed in the mobile gaming industry, in particular, in games played on smartphones, that there are games created mainly for individual play without element of player competition or requires interaction with other game players.

Some games have competitions hosted through their respective mobile applications for players to compete. However, such competitions are restricted to players of each specific game title.

Similarly, some games provide a gaming community made up of players through their respective mobile applications for players to interact. However, such communities are restricted to players of each specific game title.

Furthermore, it has been observed that not all games provide an Artificial Intelligence (A.I.) trainer to help players to practise their gaming skills. Even if the games do provide such AI trainer, some of them are unable to provide a strong AI trainer to give players a good challenge.

SUMMARY

According to an example of the present disclosure, there are provided a method, an apparatus and a user device as claimed in the independent claims. Some optional features are defined in the dependent claims.

BRIEF DESCRIPTION OF THE DRAWINGS

Embodiments of the invention will be better understood and readily apparent to one skilled in the art from the following written description, by way of example only and in conjunction with the drawings, in which.

DETAILED DESCRIPTION

Figure 1:
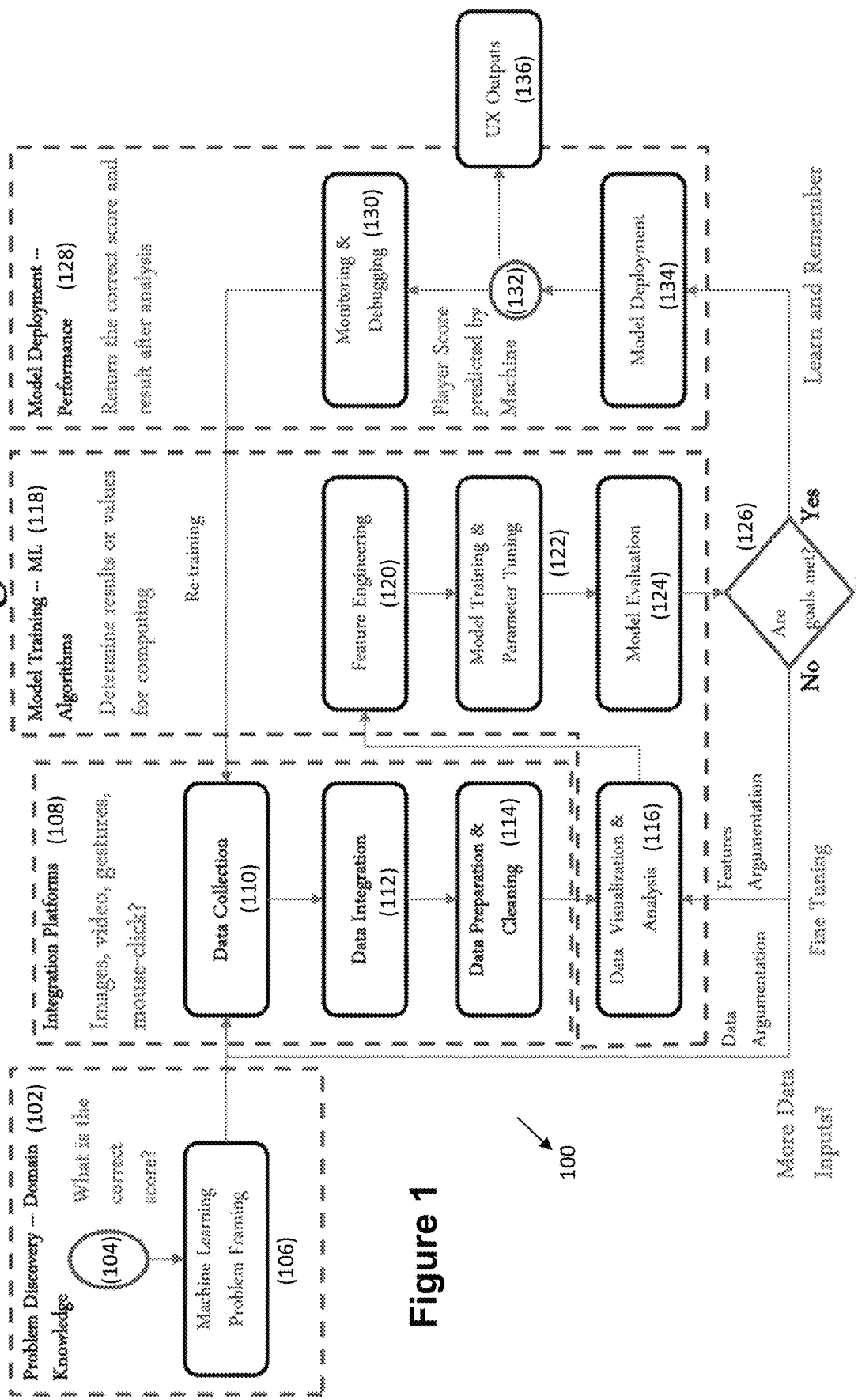
FIG. 1 illustrates a machine learning process from conception to deployment that is proposed for an example of the present disclosure.

An example of the present disclosure relates to an apparatus and a method for categorising images of mobile device software run on a user device with the help of Artificial Intelligence (hereinafter "A.I."), in particular, a computer neural network and machine learning is involved. The computer neural network can be of the type that involves deep learning.

By categorising the images of the running mobile device software into predetermined categories, the apparatus and the method of the present example are able to achieve certain objectives. For example, if the category of the images relates to scoring, ranking or levelling, the apparatus and method can process the images to determine a score, ranking or level tied to the user against scores, rankings or level of other users of the same mobile device software. If the determined category of the images relates to software abnormality, the apparatus and method can process the images to determine a state of the mobile device software to troubleshoot the mobile device software. Such troubleshooting feature can help to prevent errors or trigger reporting of malfunction or abnormality, and ensure smooth use of the platform and the mobile device.

Specifically, steps of the method may involve the following:

running mobile device software through the platform installed on the user device;

capturing images of the mobile device software as the mobile device software is running and operated by a user;

extracting image descriptors from each image of the captured images;

processing the extracted image descriptors to generate input to a model derived from a trained computer neural network;

processing output of the model to determine a category for the captured image from which the image descriptors are extracted;

extracting one or more features present in the captured image according to the predetermined one or more features to be extracted for the category; and processing the extracted one or more features to determine a score, ranking or level tied to the user against scores, rankings or level of other users of the same mobile device software in the case if the category relates to scoring, ranking or levelling.

The mobile device software refers to one or more mobile applications (in short "mobile app or apps") configured to run on a platform installed on the user device. The mobile device software of the present example refers to a mobile game application. However, in other examples of the present disclosure, the mobile device software may be a non-game mobile application as well. It should be appreciated that events and competitions can also be held for shopping applications, utility applications, and many others. For instance, a shopping event such as specific product promotion can take place across more than one shopping applications.

The user device may be a smartphone, a tablet device, a desktop computer, a laptop computer, smart TV, video game console, and the like, which is configured to run mobile apps. The apparatus of the present example may be such user device configured to have the platform.

The platform may refer to an operating system of the user device. Alternatively, the platform may be configured to operate in an existing operating system of the user device to run the mobile device software and the existing operating system of the user device is not originally configured to run the mobile device software. In some examples of the present disclosure where the user device is a desktop computer, a laptop computer, and the like having an operating system not originally configured to run the mobile device software. The user device may also be a mobile device having an operating system not originally configured to run the mobile device software, which is configured to run on another operating system.

For example, the platform may be an emulator, or software/firmware that includes such emulator to run or operate the mobile device software in an environment of an operating system not configured to run or operate the mobile device software directly. The platform may be downloaded on many user devices and each platform may communicate with a server to send data relating to each user device to the server. In this manner, for example, each platform may be configured to run the method of the present example to send data for A.I. processing to determine score, ranking or level tied to a user of each user device to the server for collating or to send the score, ranking or level directly to the server for collating after A.I. processing performed at the platform. A.I. processing may involve prediction/determination of a result using a trained model of a computer neural network.

An example of such platform is described in International Patent Application No. PCT/SG2018/050243. An application may be programmed to work on the platform so that the platform provides the features to achieve the objectives of the present example. In the case that the platform is an emulator or comprises an emulator, the platform may be programmed to provide the features to achieve the objectives of the present example.

The determined score, ranking or level can enable the apparatus and method of the present example to host competitions associated with any mobile device software run or operated on the platform. As such, games created mainly for individual play without element of competition or enable interaction with other game players may, with the help of the apparatus and method of the present example, host competition and provide interaction with other game players. With regard to non-game mobile apps, score, ranking or level may refer to a number or a status given to a user who has made a certain number of transactions or performed certain actions on a non-game mobile application.

Furthermore, with the help of the apparatus and method of the present example, game competitions no longer need to be restricted to players of each specific game title. The apparatus and method of the present example can host game competitions across or involving a plurality of game titles. More on hosting of competitions would be described later.

Moreover, gaming communities no longer need to be restricted to players of each specific game title. Gaming communities can be provided across or involve a plurality of game titles. More on gaming community and players interaction would be described later.

In addition, determination of score, ranking or level is one step towards providing an Artificial Intelligence (A.I.) trainer that can give a good challenge for players to practise their gaming skills. More on the A.I. trainer would be described later.

Typically, in order for a party to build software that is able to tap into resources of a mobile device software such as a score, ranking or level that is generated by the mobile device software, the software would require to make Application Programming Interface (API) calls to the mobile device software and/or get an API key of the developer. The API key refers to a code passed in by computer programs calling an API to identify a calling program, its developer, or its user to a Web site or another program/software. With the help of A.I. as proposed for examples of the present disclosure, such API key does not have to be obtained and API calls do not have to be made. Through A.I., a score, ranking or level can be extracted from the mobile device software by identifying images of the operation of the mobile device software that would display such score, ranking or level and then extracting such score, ranking or level from the identified images.

Some features of a method of the present example of the present disclosure are described as follows.

The method of the present example may comprise providing a messaging interface on the platform to enable communication between users that run mobile device software on the same platform installed on a plurality of user devices. In the present example, there may be present an application including such messaging interface and such application is configured to operate or run on the platform. Alternatively, the platform is configured to provide such messaging interface. Users who run mobile device software on the same platform can be linked up via the messaging interface. This messaging interface enables a gaming community to be built across a plurality of game titles played on or through the same platform. Furthermore, in this manner, the method enables a gaming community to be built for any mobile game regardless of whether the respective mobile game application of the mobile game provides any in-application gaming community features. With regard to non-game mobile apps, the messaging interface enables users to build a community for non-game mobile apps that do not provide a community for user interaction.

The method of the present example may comprise checking content in a data log of the messaging interface to identify unacceptable content entered or uploaded by the user and to take action against the user through the platform if unacceptable content is identified.

The method of the present example may be configured to extract features from the content of the messaging interface, input the extracted features from the content to a model derived from a trained computer neural network, and process output of the model to determine whether the content is acceptable or unacceptable. This would be another example of the use of the A.I. in the present disclosure. The A.I. implementation information provided later is applicable to this example.

The method of the present example may comprise providing an event interface on the platform to enable user participation in an event relating to one or more mobile device software. The application of the present example may include such event interface to enable users playing games across a plurality of game titles to participate in an event that may involve one game title or a plurality of game titles through the event interface. In the present example, there may be present an application including such event interface and such application is configured to operate or run on the platform. Alternatively, the platform is configured to provide such event interface. The event may be a game competition for one game title or involve more than one game title. In this manner, the present example enables competitions to be held for any mobile game regardless of whether the respective mobile game application of the mobile game provides any in-application competition features. With regard to non-game mobile apps, the event interface enables users to hold events for non-game mobile apps that do not provide event hosting/management functions.

To filter down the number of players or to enable players of similar skill/standing to compete, the event relating to the one or more mobile device software may be opened to users of predetermined score, ranking or level.

The event interface provided on the platform may be configured to enable user viewing of details of one or more past, present or future events relating to the one or more mobile device software. This enables each user to, for instance, review past game competitions to see the score, ranking or level acquired by the user. The user may also see what game competitions are presently taking place and the progress of the user or other users in the game competitions. Furthermore, the user may see what future game competitions would be held and are opened for user participation.

The method of the present example may comprise enabling through the event interface provided by the platform, user hosting of an event relating to the one or more mobile device software. This enables each user to, for instance, start a game league, tournament, or challenge one or more other user to one or more games.

The method of the present example may comprise enabling through the event interface provided by the platform, user selection of a public event registrable by any user or private event registrable by limited users. Such feature enables users to hold public or private events.

The method of the present example may comprise determining an event for pushing to the event interface based on the determined score, ranking or level. For example, if a user reaches a certain score, ranking or level, the method determines an event associated with the score, ranking or level to be pushed to the event interface for the user to consider for participation.

The method of the present example may comprise receiving user input for operating the mobile device software and consider the user input in the determination of the category of the image. Specifically, in the method, the steps involved may include receiving user input for operating the mobile device software, converting user input into user input descriptors, and processing the user input descriptors in addition to processing the extracted image descriptors to generate input to the model for the determination of the category of the image. For example, in the case that the category of the image is determined by the machine to have a low accuracy rate or relevance rate, the user input operating the mobile device software can be a consideration to determine the category of the image. For example, for certain mobile device software, a user input may normally accompany or follow before/after a certain image that is displayed. Hence, if for some reason, the image category determination by the A.I. for an image is of low accuracy, the machine can be configured to consider the user input that normally accompany or follow before/after the image that has been categorised. Such user input can be represented by one or more descriptor to be inputted to the model for prediction/determination. The one or more descriptor may include a feature vector comprising one or more variable representative of the user input. It is noted that the low accuracy for image category determination may, for instance, be due to an update performed on the mobile device software that changed the way images are displayed.

The method of the present example may comprise enabling setting up of a game league comprising more than one users of the mobile device software and using the score, ranking or level of the more than one users to determine one or more winner in the game league. It has been observed that a tool to enable users to conveniently set up a game league for users of mobile device software is not present in the state of the art relevant to the present disclosure. Hence, providing such game league set up tool is beneficial to users. More details on the game league set up interface will be discussed with reference to FIGS. 7 to 11 later.

The method of the present example may comprise displaying graphics of one mobile device software operated by a user on a first screen of a viewing interface comprising at least two screens and for selecting, from a list comprising one or more users, a user so as to display graphics of the mobile device software operated by the selected user on a second screen of the at least two screens. The viewing interface may be provided by the platform. More details on features to the two screens will be discussed with reference to FIG. 12 later.

In a case where there are more than one user devices, each user device may be configured to have the platform to run the mobile device software and the images of the mobile device software run on each user device are to be categorised by the model. The method may comprise grouping the more than one user devices into more than one clusters and image categorization for each cluster comprising a portion of the more than one user devices is handled by a master device. Such clustering and the presence of more than one master devices help to manage computation load of the A.I. deployed for prediction/determination of image category requested by more than one user devices. One server may not be enough to the handle the prediction/determination requests from many user devices. More details on such clustering will be discussed with reference to FIG. 6 later.

With reference to FIG. 1, there is provided a flowchart 100 relating to the implementation of an apparatus and method of the present example. There are four areas of consideration, namely:

1) Problem Discovery 102 that makes use of domain knowledge to frame a problem for machine learning;
2) Integration platforms 108 focused on data collection 110, data integration 112, and data preparation and cleaning 114;
3) Model training 118 involving Machine Learning (ML) algorithms and determination of results or values for computing would include steps for feature engineering 120, conducting of model training and parameter tuning 122, and model evaluation 124; and
4) Model Deployment 128 involving performance consideration, monitoring and debugging 130, conducting of the model deployment 134, and providing user experience output 136.

With regard to problem discovery 102, the process is started at a step 104 and a technical problem has to be established and framed for the machine learning at a step 106. For instance, the right question for the A.I. to solve has to be formulated. In the present example, one of the questions for the A.I. to solve is "What is the correct score, ranking or level to extract from images of the mobile device software run on the platform?" The solution to this question requires a suitable A.I. model for image analysis. A second question may be what constitutes an image of the mobile device software that is indicative of error or malfunction. The solution to this second question also requires a suitable A.I. model for image analysis. A third question to solve may be what constitutes unacceptable content in data of a messaging interface. The solution to this third question may be a suitable A.I. model for text recognition and/or image recognition of text. A fourth question that may be solved is what event to be pushed to an event interface based on user score, ranking or level. The solution to this fourth question may be a suitable A.I. model for analysis of user data and user usage pattern/trends to understand the user and propose the event to a user. These four questions set out four areas in which A.I. may be used for the examples of the present disclosure. Although, the disclosure on A.I. provided in the present disclosure is more focused on an A.I. model for image analysis, it is appreciated that the same A.I. disclosure can be easily adapted for text recognition and/or image recognition of text, and for analysis of user data and user usage pattern/trends to understand the user and propose the event to a user.

After problem discovery 102, Integration platforms 108 would be considered. That is, after step 106, a step 110 for data collection is performed by the A.I. for learning prior to deployment and for continuous learning after deployment. In the present example, the data to be collected includes videos and/or images of the mobile device software running on the platform. The data to be collected may also include data of user input such as user gestures in the case that the user device is configured to receive user gestures as user input via a touchscreen or image capture of the user gestures. The user input may further include computer cursor/mouse actions and/or keyboard entry in the case that the user device is a desktop or laptop computer. Such user inputs may also be processed and put through machine learning to improve result prediction/determination accuracy.

At a step 112, data integration takes place, the collected data for A.I. Learning has to be integrated into a common consistent format such that the data can be queried, searched, accessed and/or combined. One proposed approach for such integration is the use of appropriate database schema mapping and indexing to identify and reference data.

At a step 114, data preparation and cleaning has to be performed on the integrated data of step 112. For instance, the integrated data can categorised into groups and the data can be cleaned by inserting missing values with substituted data or values. For example, aggregated data values can be categorised into ranges like "0-49.9%" to indicate "losing a game", "50%" to indicate "a draw in a game" and "50.1-100%" to indicate a "a win in a game". Such data preparation and cleaning process filter the integrated data and eliminate data that do not meet certain criteria.

At a step 118 after step 114, data visualization and analysis has to be performed and this involves a process of combining an array of static and interactive visuals to associate them to a specific context to help understand and make sense of a large amount of data. For example, mobile device software can be operated to display different languages. There will then be a large number of similar static or video images all referring to a specific object and/or objective but with text provided in different languages. Despite the different languages displayed, the trained machine has to be able to tell that these similar static or video images refer to or are directed to the same thing or same data.

Following step 118, a step 120 of Feature Engineering will be involved. This refers to a process of transforming collected data for A.I. learning into features for a predictive or determination model of a computer neural network to better process the collected data for to make predictions or determinations. For instance, for certain mobile device software, a predictive or determination model can make use of an extracted feature that is "text color" to determine if it is a "win" or "lose" result, "blue" or "green" can be used for a "win" result while "red" may mean "lose". "win" or "lose" may then be indicative of a certain level attained by the user operating the mobile device software.

After step 120, a step 122 of Model Training and Parameter Tuning will be involved. This refers to a process of selecting a model of a computer neural network with a suitable predictive or determination function and to train the model for more efficient prediction or determination with training data consolidated from the collected data. Parameters such as weightage and bias can be adjusted by either a user or the machine itself during the machine training or learning process accordingly to provide more correct predictions. For instance, by adjusting the weightage of certain imaging data to have a higher priority, the model will be able to derive the correct prediction more accurately.

After step 122, a step 124 of Model Evaluation has to be performed to test the model with data not used during training to obtain a prediction by the model itself. A main evaluation key point will be the accuracy of the prediction. After model evaluation at step 124, a step 126 is performed to check whether the goals comprising of the technical problems to be solved are met. If not, fine tuning to the model is required to check whether more data inputs are required and if more data inputs are required, the flow goes to the step 110 on data collection. There may be features argumentation and data argumentation involved in the fine tuning.

Features Argumentation is a fine-tuning process done to cater for more possible ways to derive a predictive answer or to determine a result such as a score. For instance, "blue" indicative of "win", "green" indicative of "win", and "red" indicative of "lose", may be common answers for one kind of mobile device software with such characteristics. However, what if there are no such colors in the images received from a video stream of a piece of mobile device software that is of the same kind. Such situation may occur if the mobile device software hangs or malfunctions and causing the expected colors to not display or to display abnormally. In this case, the model can be adjusted to rely on other methods from the provided or input data to deduce the right answer for "win" or "lose". For example, like a mouse click from a user on a specific result button would likely indicate a "win" or a "lose" or the displaying of certain characters/animation on a game play screen would like indicate a "win" or "lose".

Data Argumentation is done to provide all possible scenarios of how data is to be presented for Machine Learning. For example, game images of certain mobile game applications can be displayed in landscape and/or portrait mode, or even inverted if the player is required to play with such features. All different case scenarios in the data collected for machine learning has to be explored.

If the goals are met at step 126, the model has learnt and remembered and Model Deployment at a step 134 is performed to set up endpoint infrastructure where data can be collected either on client side or server side. The collected data is for a trained model to predict or determine the correct answer/result (e.g. correctly determination of a score from input images). The collected data is also used for the trained model to continue to train. In the present example, client side refers to one or more user device installed with the platform to run one or more mobile device software (e.g. one or more mobile applications). Server side refers to one or more servers configured for data communication with the one or more user devices. The program for the A.I. can be provided on either the client side or server side, or even both.

After deployment at step 134, operation of the A.I. takes place at a step 132. In the present example, which involves a mobile game application, player score is predicted or determined by the A.I. at the step 132. Such prediction/determination may involve determining which category images obtained from the game play of the mobile game application would lie in and extracting the player score from one or more images of a specific category will contain the text of the player score for extraction, for instance, through Optical Character Recognition (OCR) technique.

As the A.I. is operating at the step 132, Monitoring and Debugging at a step 130 can be performed automatically or by a user to ensure the A.I. is operating properly, and to troubleshoot and debug the code of the A.I. program if error occurs and/or the accuracy rate of the model drops. The input data to the model can be analysed to recreate the model in the case of loss of accuracy. The model can be fine-tuned for improvement. Certain data causing high inaccuracy in prediction may be restricted. One example may be a high loss of accuracy when images contain multiple layers of entanglement or conflicting colors within the image are present.

As the A.I. is operating at the step 132, User Experience (UX) Outputs would be created at a step 136. For example, a User Experience (UX) screen can be provided to show prediction results such as win rate based on past data, suggest events to participate, and determine players' ranking, level and scores.

Figure 2:
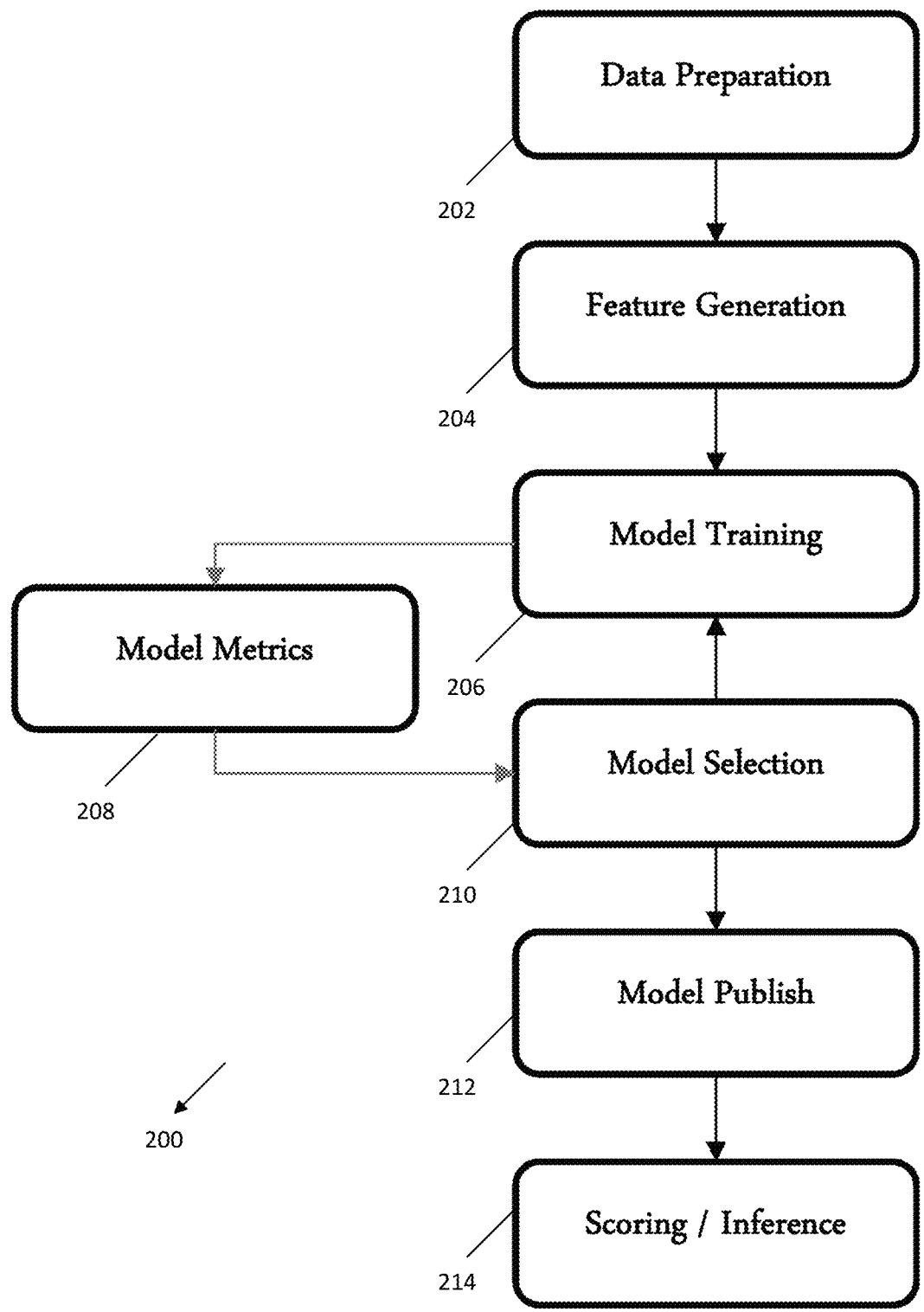
FIG. 2 illustrates details of a proposed model derivation process in a machine learning process of an example of the present disclosure.

With reference to FIG. 2, an example of a machine learning process 200 is discussed as follows.

A step 202 of Data preparation first commences to mine for data sources and data set to be used for machine learning. In the case of categorising images from video streams of a mobile game application to extract certain features from a specific category of images to determine a certain result, for instance, a score, ranking or level of a user, the data source and data set can include videos of game play provided by the public on the internet on video posting websites. In the present example, in addition to relying on videos of game play provided by the public, different scenarios of game play that would trigger images to be categorised differently by the machine can also be played out on the mobile game application and recorded as a video to form part of the data sources and data set.

After obtaining the data source and data set at step 202, the feature points to be obtained from the data source and data set have to be determined and generated at a step 204. This step 204 is called feature generation. Specifically, to implement a computer neural network, for example, descriptors for the feature points have to be worked out. After extracting the descriptors, the descriptors will form the input to the model of the computer neural network that would be subject to learning and/or the input to the model for actual prediction or determination. The feature points or descriptors can be determined depending on the computer neural network algorithm that is used. For example, in the case of working on a model to categorize images, image descriptors relating to certain feature points of the images may be extracted from the images to be inputted to the model for learning and for actual prediction/determination after the model is trained. Feature points to be extracted from the images can pertain to data relating to user score, ranking or level, user game or usage time, character/language recognition, features relating to workflow of the mobile device software, user identification features and so on. Descriptors are typically mathematical equations including feature vectors that have to be worked out from the feature points that are of interest.

A step 206 of Model training comes after the step 204 of feature generation. This involves finding patterns in the data source and data set that are capable of predicting or determining the category of images that would contain features containing information such as the score, ranking or level of a user, which are to be extracted from the images. Depending on the model and result to be predicted or determined, there may be involved binary classification (True or False), multiclass classification (Limited, predefined values) and regression that predicts/determines a numerical value (that may be indicative of a response) from a continuous input data set at the model training stage.

Model Metrics are considered at a step 208 during model training, which involves establishing and fine-tuning of the model metrics that may include classification metrics and regression metrics.

Classification Metrics include classification accuracy, logarithmic loss, and area under a Receiver Operating Characteristic (ROC) Curve.
 a. Classification accuracy refers to the number of correct predictions/determination made as a ratio of all predictions made.
 b. Logarithmic loss (or log loss) is a performance metric for evaluating the predictions of probabilities of membership to a given class.

c. Area under ROC Curve is a performance metric for binary classification to discriminate between positive and negative classes.

Regression Metrics include mean absolute error, mean squared error, and R^2.
   i) Mean Absolute Error refers to the sum of the absolute differences between predictions/determinations and actual values with the wrong answers.
   ii) Mean Squared Error refers to the mean absolute error in that it provides a gross idea of the magnitude of error.
   iii) R^2 metric provides an indication of a good fit to a set of predictions/determinations to the actual values. In statistics, this measure is called the coefficient of determination.

A step 210 of Model selection following model metrics consideration at step 208 is part of the machine learning process that involves evaluation of the predictive performance of a selected model by making use of Area Under ROC Curve in the case of Binary classification, Macro-averaged F1-score in the case of multiclass classification and Root Mean Square Error in the case of regression determination or prediction. The fine-tuned model with best evaluation would be the one to be subject to model training and the trained model would be deployed for prediction/determination. The model metrics discussed above have an effect on model selection as well. The step 206 of Model Training, step 208 of Model Metrics consideration and Model selection at step 210 can be deemed to be a looped process to determine the best model to select as indicated by the arrows in FIG. 2.

A step 212 of Model publishing can be done after model selection at step 210 and it involves deploying the trained model for tuning of parameters to obtain further accuracy. All training values may be initialized to zero.

A step 214 of Scoring/Inference after step 210 relates to prediction/determination of an outcome of the established technical problem based on the machine learning. For example, an accuracy or relevance rate can be determined for each prediction/determination made by the A.I. for fine-tuning or diagnostic purposes. This step 214 is done after model publishing to determine the readiness of the model for actual deployment.

Figure 3:
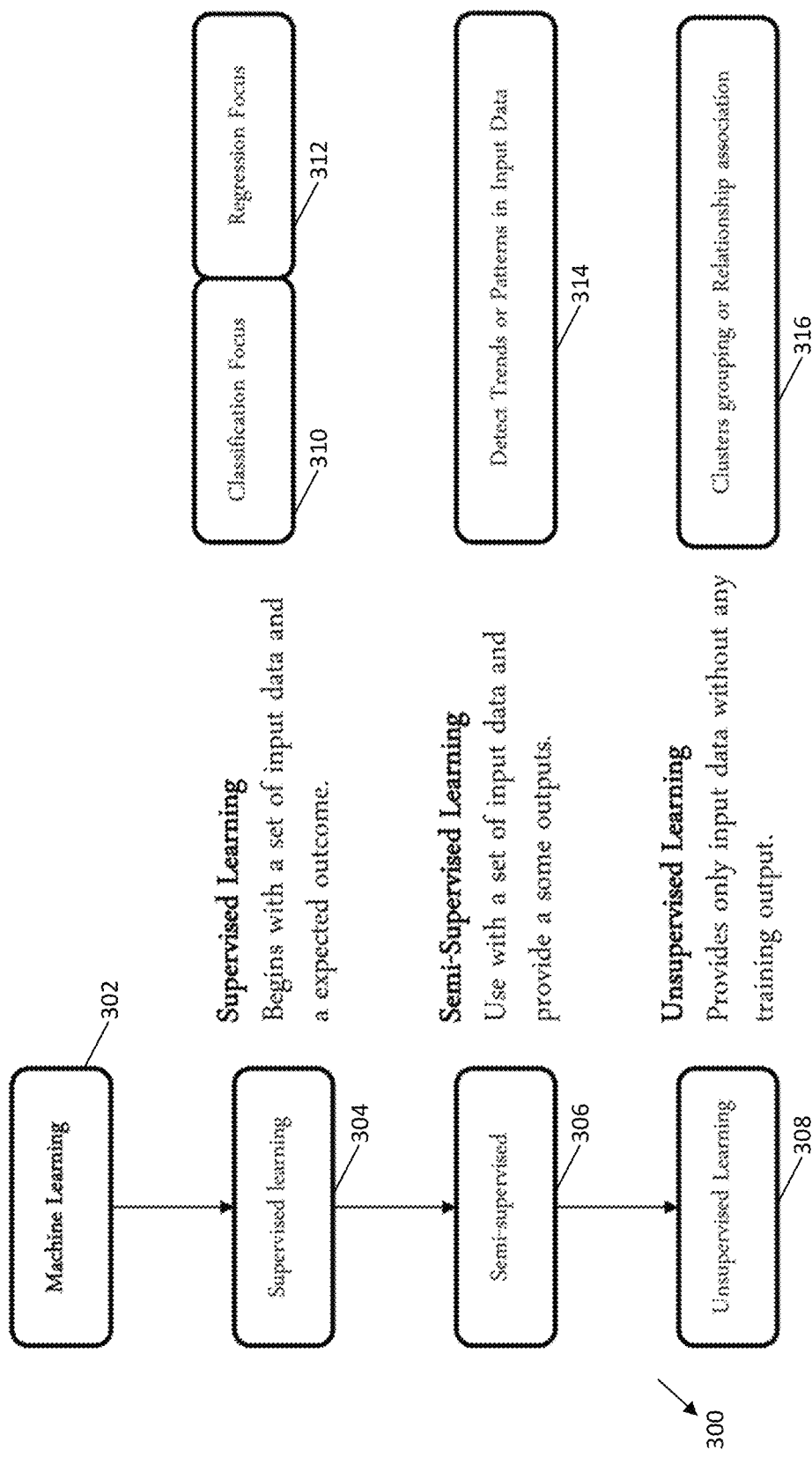
FIG. 3 illustrates different levels of supervision involved in a machine learning process of an example of the present disclosure.

FIG. 3 illustrates a machine learning process 300 that would first commence machine learning at a step 302 and go through sequentially 3 steps of learning that is supervised learning 304, semi-supervised learning 306, and unsupervised learning 308. Supervised learning 304 involves beginning the learning process with a set of input data with an expected outcome (hereinafter also known as "training output") to the machine. During Supervised learning 304, it can be classification focus 310 or regression focus 312 depending on what needs to be predicted/determined by the machine. Semi-supervised learning 306 involves providing a set of input data with some input data that has expected outcome and the remaining input data would be the kind that requires the machine to provide outputs independently. During semi-supervised learning, trends and/or patterns 314 in the input data and the corresponding outcome can be detected via manual user analysis or with the aid of a machine programmed to identify such trends and/or patterns. Unsupervised learning 308 involves providing only input data without any expected outcome for the machine to provide all outputs independently. During unsupervised learning 308, clusters grouping or relationship association 316 derived from the identified trends and/or patterns can be formed and the equations pertaining to the model can be adjusted for better accuracy. The end prediction/determination results of the machine can be checked manually by a user or using a machine programmed to identify right and wrong results. During the entire learning process 300, the model can be adjusted accordingly to improve accuracy.

Figure 4:
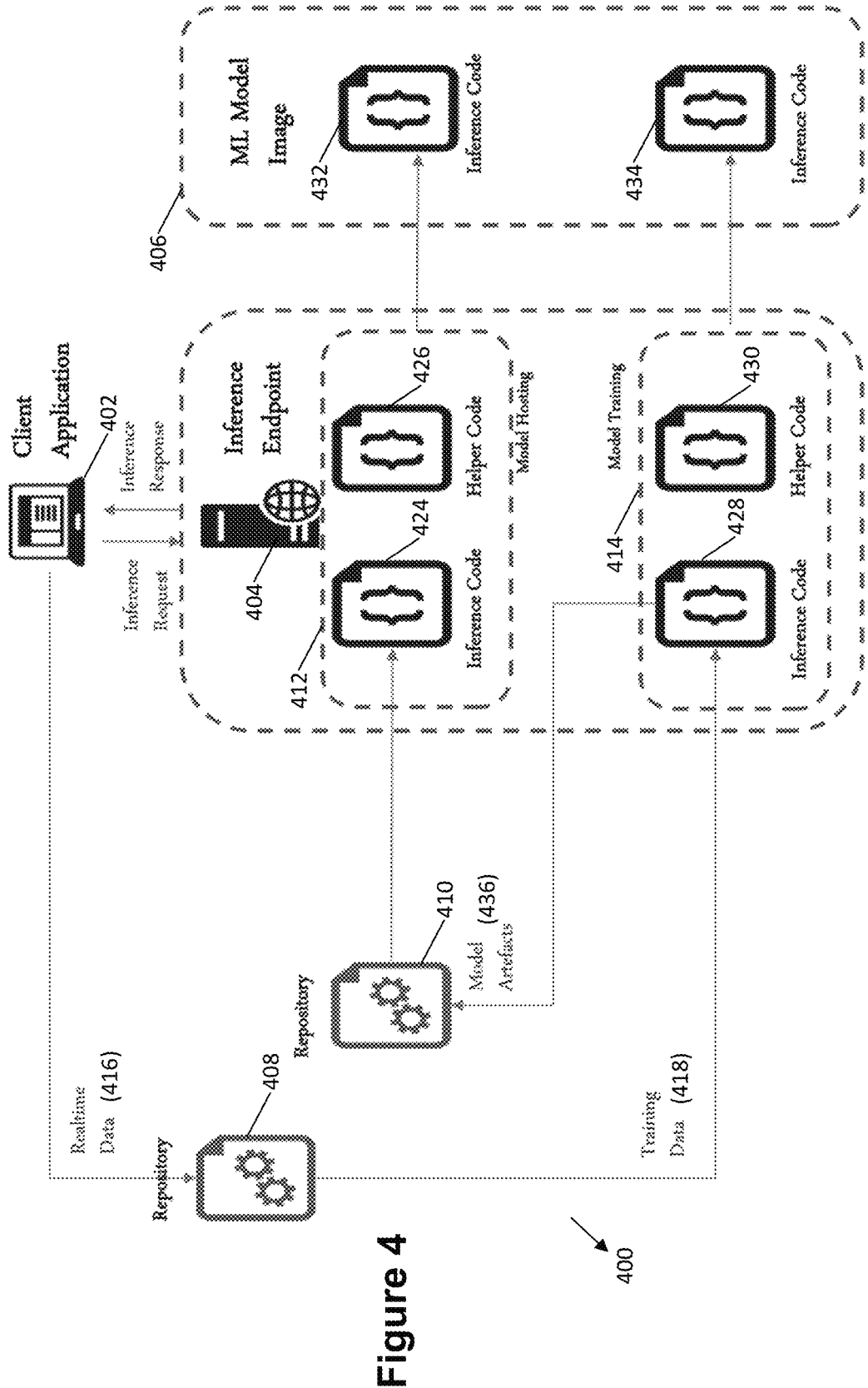
FIG. 4 illustrates a machine learning architecture according to an example of the present disclosure for machine training purposes.

FIG. 4 illustrates a machine learning architecture 400 proposed for A.I./machine training or learning according to an example of the present disclosure.

The machine learning architecture 400 includes the following components.

1) A Client Application 402 that can be part of a platform of a user device or an application installed on the platform described earlier. The client application 402 is used to send inference request for A.I. processing. An inference request refers to, for instance, a request to the A.I. to make a prediction/determination. The client application 402 is also used to receive inference responses. An inference response is a prediction/determination result produced in response to an inference request.

Optionally, in the present machine training example, a piece of mobile device software, for instance, a mobile app to be subject to prediction/determination to obtain a result can be run on the platform to provide real-time training data input. In the case of predicting a category for images of the mobile device software, the platform can be configured to execute instructions to capture images of user operation of the mobile device software from the graphics generated for the mobile device software. Such captured images are input data to be processed by the client application 402 to generate an inference request for A.I. processing to predict or determine the category of the captured images. Hence, for instance, one or more users may, for instance, operate a piece of mobile device software or play a mobile game application and such user operation is recorded real-time as a video for streaming and generated as inference requests to the A.I. for A.I. training purposes.

Further action can be taken later to deal with the categorised images, such as determining (e.g. through Optical Character Recognition technique) a score, ranking or level of a user contained in an image indicating score, user identifier contained in an image showing user identity, error message in an image indicating malfunction, identifying a specific user action or event from an image indicating such user action or event, etc. The extracted score, error, user identifier, user action and/or event may then be utilised for the features directed to community building, messaging, competition/event organizing, game play set up, and mobile device software troubleshooting, described earlier.

2) A Machine Learning (ML) Model image 406 that refers to a computer neural network model that is used for the prediction/determination. The ML Model image 406 comprises inference code 432 to apply the prediction/determination algorithm for prediction/determination. The ML Model image 406 further comprises inference code 434 for further training/adjustment and building of the ML Model image 406.

3) A Repository 408 that is a data storage location where input data to the train the Machine Learning (ML) Model image 406 resides. The client application 402 obtains from the Repository 408 Real-time Data 416, including raw data in the form of Video, Image, Audio file/clip, and User input such as Voice command, Mouse Click, Captured Gesture (e.g. gesture made on touchscreen, gesture captured by one or more camera/sensor that is part of the user device, and the like), Keyboard entry, and the like. Real-time Data 416 are streamed in real-time to the client application 416, which would process the real-time data 416 into inference requests. The Repository 408 may also supply training data 418 that can be real-time or not real-time for further training the A.I. FIG. 3 that is described earlier illustrates how the real-time data 416 and/or the training data 418 can be fed to the Inference Endpoint 404 in different stages of machine learning at different supervision levels.

4) A Repository 410 that is a data storage location where input data such as model artefacts 436 to adjust the Machine Learning (ML) Model image 406 resides. Model artefacts refer to data which are prepared and transformed for the ML Model image 406. Such data includes feedback to the ML Model image 406 may specifically include classifiers, updated classifiers, adjusted weightages, and/or the like.

5) An Inference Endpoint 404 that can be a server separate from the user device, software that is part of the platform, or software that is installed on the platform. The Inference Endpoint 404 is configured to send inference responses and receive inference requests to and from the client application 402 respectively. The Inference Endpoint 404 is also configured to send inference responses and receive inference requests to and from the ML Model image 406 respectively. The Inference Endpoint 404 can comprise of two components, a model hosting instance or unit 412 and a model training instance or unit 414.

The model training unit 414 can be a server instance that is used to take in the training input data 418 from the Repository 408 and send them to the ML Model image 406 for A.I. training, and to send model artefacts 436 to the Repository 410 for storage. The model training unit 414 can be configured to determine which aspect of the model requires adjustment/updating/feedback and obtains data of the model artefacts 436 accordingly for sending to the Repository 410 for storage. The model training unit 414 comprises inference code 428 to apply and/or adjust the prediction/determination algorithm. The model training unit 414 further comprises helper code 430 for building the ML Model image 406 and includes code not for prediction/determination such as codes for handling sending and receiving of model artefacts 436, inference responses and training data 418.

The model hosting unit 412 can be a server instance that is used to receive inference requests from the client application 402 and forwards them to the ML Model image 406 for A.I. training, and to return inference responses resulting from prediction/determination by the ML Model image 406 to the client application 402. The model hosting unit 412 is configured to receive model artefacts 436 from the Repository 410 for the ML Model image 406. The model hosting unit 412 comprises inference code 424 to apply the prediction/determination algorithm and/or adjust the algorithm based on the model artefacts 436. The model hosting unit 412 further comprises helper code 426 for building the ML Model image 406 and includes code not for prediction/determination such as codes for handling sending and receiving of model artefacts 436, and receiving of inference requests from the client application 402 and sending of inference responses to the client application 402.

Figure 5:
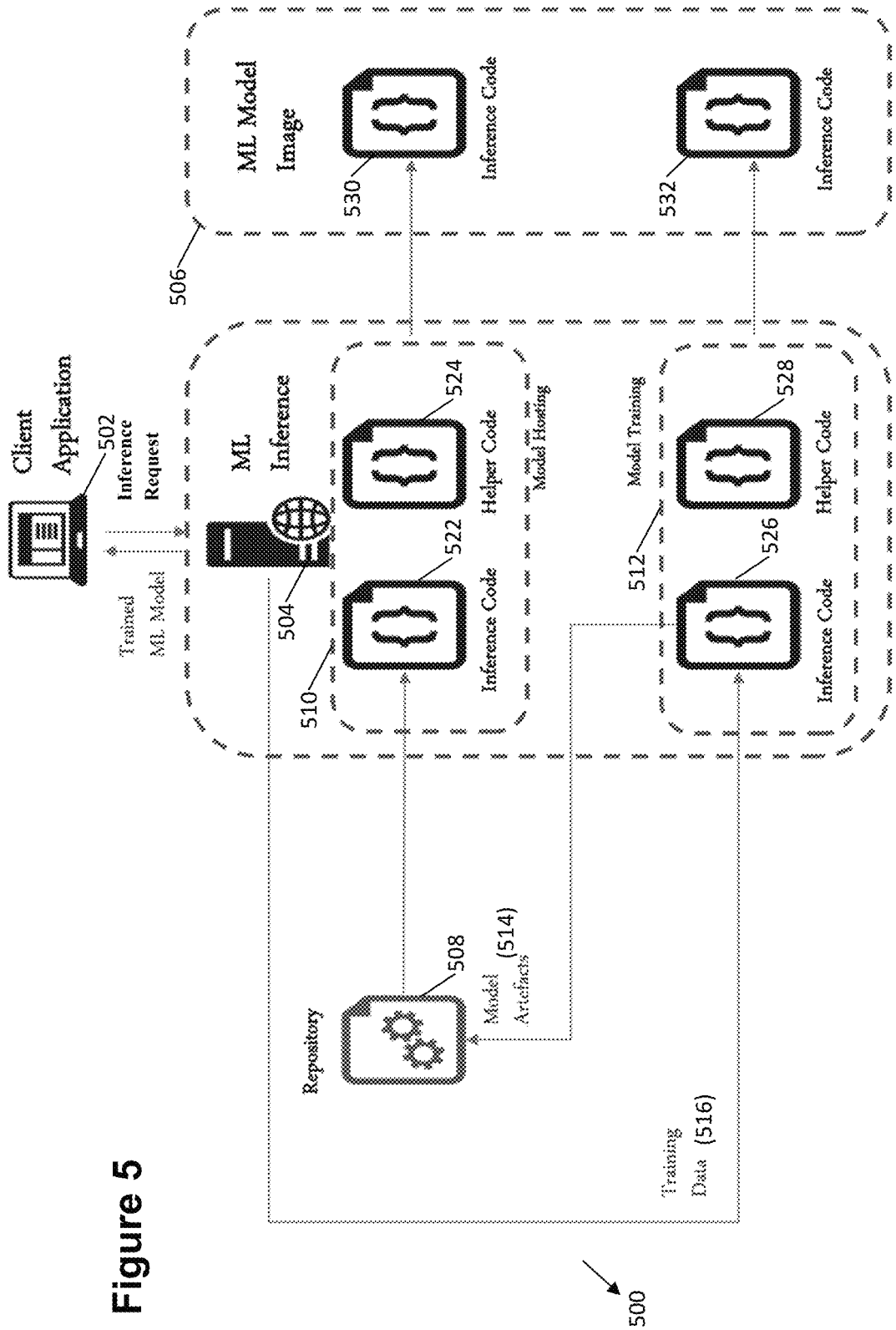
FIG. 5 illustrates a machine learning architecture according to an example of the present disclosure for deployment.

FIG. 5 illustrates a machine learning architecture 500 proposed for deployment according to an example of the present disclosure. Different from the case of FIG. 4, in the case of FIG. 5, the A.I. or machine model is already trained.

The machine learning architecture 500 includes the following components.

1) A Client Application 502 that can be part of a platform of a user device or an application installed on the platform described earlier. The client application 502 is used to send inference request for A.I. processing. Similar to FIG. 4, an inference request refers to, for instance, a request to the A.I. to make a prediction/determination. The client application 502 is also used to receive inference responses. An inference response is a prediction/determination result produced in response to an inference request. Different from the case of FIG. 4, the inference response in the case of FIG. 5 is a response received from a trained Machine Learning (ML) Model.

In the present A.I. deployment example, a piece of mobile device software, for instance, a mobile app to be subject to prediction/determination to obtain a result can be run on each platform of a plurality of user devices. Each user device would comprise the client application 502. The client application 502 may be a component of each platform or installed on each platform. In the case of predicting a category for images of the mobile device software, the platform can be configured to execute instructions to capture images of user operation of the mobile device software from the graphics generated for the mobile device software. Such captured images are input data to be processed by the client application 502 to generate an inference request for A.I. processing to predict or determine the category of the captured images. Hence, for instance, there can be one or more client application 502 recording real-time user operation of a piece of mobile device software or user playing of a mobile game application run on the platform as a video for streaming and generating the real-time video streams as inference requests to the A.I. for prediction/determination of the category of captured images. After the categories of the images are identified, different actions to extract desired features can be performed on the categorised images.

2) A Machine Learning (ML) Model image 506 that refers to a computer neural network model that is used for the prediction/determination. The ML Model image 506 comprises inference code 530 to apply the prediction/determination algorithm for prediction/determination. The ML Model image 506 further comprises inference code 532 for further training/adjustment and building of the ML Model image 506.

3) A Repository 508 that is a data storage location where input data such as model artefacts 514 to adjust the Machine Learning (ML) Model image 506 resides. Model artefacts 514 refer to data which are prepared and transformed for the ML Model image 506. Such data includes feedback to the ML Model image 506 may specifically include classifiers, updated classifiers, adjusted weightages, and/or the like.

4) An Inference Endpoint 504 that can be a server separate from the user device, software that is part of the platform, or software that is installed on the platform. The Inference Endpoint 504 is configured to send inference responses and receive inference requests to and from the client application 502 respectively. The Inference Endpoint 504 is also configured to send inference responses and receive inference requests to and from the ML Model image 506 respectively. The Inference Endpoint 504 can comprise of two components, a model hosting instance or unit 510 and a model training instance or unit 512.

The model training unit 512 can be a server instance that is used to take in inference requests as input data 516 from the Inference Endpoint 504 and send them to the ML Model image 506 for further A.I. training. The model training unit 512 also sends model artefacts 514 to the Repository 508 for storage. Even after the A.I. is deployed, training still continues through the model training unit 512. The Inference Endpoint 504 prepares the training data 516 obtained from the client application 502 for sending to the model training unit 512. The model training unit 512 can be configured to determine which aspect of the model requires adjustment/ updating/feedback and obtains data of the model artefacts 514 accordingly for sending to the Repository 508 for storage. The model training unit 512 comprises inference code 526 to apply and/or adjust the prediction/determination algorithm. The model training unit 512 further comprises helper code 528 for building the ML Model image 506 and includes code not for prediction/determination such as codes for handling sending and receiving of model artefacts 514, inference responses and training data 516.

The model hosting unit 510 can be a server instance that is used to receive inference requests from the client application 502 and forwards them to the ML Model image 506 for A.I. prediction/determination, and to return inference responses resulting from prediction/determination by the ML Model image 506 to the client application 502. The model hosting unit 510 is configured to receive model artefacts 514 from the Repository 508 for the ML Model image 506. The model hosting unit 510 comprises inference code 522 to apply the prediction/determination algorithm and/or adjust the algorithm based on the model artefacts 514. The model hosting unit 510 further comprises helper code 524 for building the ML Model image 506 and includes code not for prediction/determination such as codes for handling sending and receiving of model artefacts 514, and receiving of inference requests from the client application 502 and sending of inference responses to the client application 502.

Figure 6:
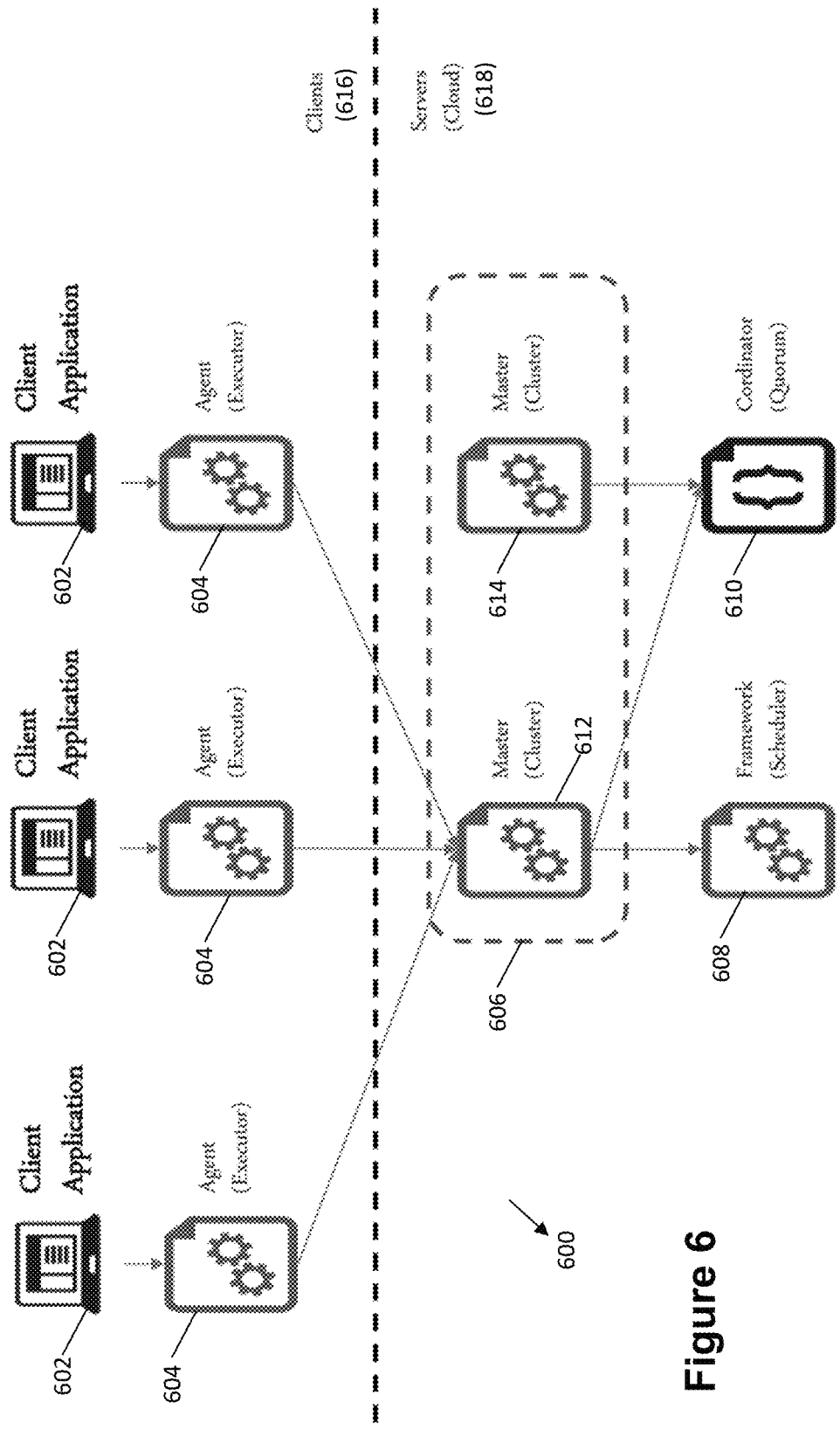
FIG. 6 illustrates a machine learning architecture according to an example of the present disclosure for deployment.

FIG. 6 illustrates a machine learning architecture 600 proposed for deployment according to an example of the present disclosure.

The machine learning architecture 600 builds upon the architecture 500 of FIG. 5. FIG. 6 shows a plurality of client applications 602, specifically 3 in total. All the client applications 602 are deemed as clients 616. These client applications 602 are considered to be 1 cluster. There can be other client applications 602 that are clustered in separate clusters. Each client application 602 is configured to include the same features as the client application 502 of FIG. 5. In addition to the features equivalent to the client application 502 of FIG. 5, each client application 602 is configured to include an executor agent 604, which can be an instance of the client application 602 that is used for connecting to one or more servers 618, which may be part of a cloud service. FIG. 6 shows a specific server 606 of the one or more servers 618.

The server 606 may include one or more cluster masters. In the present example, there are two cluster masters 612 and 614. Each cluster master is configured to include all the features of the inference endpoint 504 of FIG. 5. The cluster master 612 specifically takes care of the A.I. processing of the cluster comprising the client applications 602. The cluster master 614 takes care of the A.I. processing of another cluster comprising other client applications (not shown).

Each cluster master can be a server instance or server instances configured to receive inference requests from its cluster of client applications and send inference responses (i.e. prediction/determination results) to its cluster of client applications.

Each master, for instance 612 and/or 614, is configured to work with a framework scheduler 608 for resource and job scheduling and management of each cluster. Resource and job scheduling can refer allocation of computing resources at each master and scheduling of when to handle jobs for incoming inference requests from the cluster of each master. Management of each cluster can refer to handling/maintaining/checking the connection of each client application with its cluster master and react in the case that communication with a client application is dropped or connected etc.

Each master, for instance 612 and/or 614, can be configured to connect with a coordinator 610 (or quorum handler), which provides coordination service such file distribution and message queue for messages transmitted between each master and the client applications in its cluster. The coordinator 610 may also handle communication between masters. There may be a queue system in which inference requests and responses to and from client applications of each cluster are handled first in first out. If a queue is formed, an A.I. prediction/determination job can be scheduled accordingly by the framework scheduler 608 for completion. If too many inference requests are received for a particular cluster, the job may be passed to other masters with capacity to handle the job by the coordinator 610. The framework scheduler 608 and the coordinator 610 are computer applications or programs configured to do what has been described above.

The following description describes event set up features of an example of the present disclosure that is performed using an event interface provided by the platform. The platform of each user device is configured to provide such event interface for organizing events.

Through the event interface, each user or player of each user device can organise an event, for example, select any mobile game application installed on the platform for competitive play with friends or unknown players also using the common platform on their user device. The platform may provide the event interface in a form of a game library that displays a plurality of mobile game applications installed on the user device that can be selected for organizing an event.

Through the event interface, users or players can view their own achievements, rankings, standings, scores in a ladder system and score board relating to a particular mobile device software or mobile game application. It is noted that even a non-gaming mobile app can have score, ranking, level and the like, which can be determined through A.I. processing as described earlier.

Through the event interface, users or players may watch live stream or replay of game or any tournament or competition organised via the platform.

Through a messaging interface provided by the platform, users or players would be able to upload their avatar, communicate with other players on topics related to games or a common mobile device software used among them.

In an example of the present disclosure, event organizing relating to a mobile game application is made possible by, for instance, having a system comprising more than one user devices and more than one servers similar to the setup of FIG. 6. There may be present a Score Tracking System managed by the more than one servers to record all the scores, rankings and levels of users of the more than one user devices determined through A.I. processing that involves categorization of captured images of user operation using A.I. to identity image or images of the category that can be used to determine score rank or level. The ability to determine and track the scores, rankings and levels of users of the more than one user devices are crucial to enable the events relating to the mobile game application to be organized.

Four types of events indicated as follows may be organized using the event interface provided by the platform for any mobile game application as long as the mobile game application has some form of score, rank or level that can be determine from the A.I. processing described earlier to distinguish between better players and poorer players.

1) Single player versus another single player. For example, a player may select a game in a game library provided by the platform and see a list of players currently playing or have logged in to the selected game. The player may then select a player from the list to challenge that selected player to the selected game. Details on organizing a single player versus single player event would be described with reference to FIGS. 13 to 15 later.

2) League Battle, wherein a player or a team of more than one player joins a league.

3) Multiplayer (i.e. more than one player) game, wherein more than one players compete with one another.

4) Team Matches, wherein a team comprising more than one player competes with another team.

Details on organizing League Battle, Multiplayer game and Team Matches would be described with reference to FIGS. 7 to 11, and 16 to 19 later.

In the four types of events for a mobile game application, a game organizer may select game to play, who to play with in the case of single player battle, winning condition or conditions, which players to include in the case of team matches, number of rounds of game play, score/rank/level of players who can participate, winnings (i.e. prizes or rewards), etc. Game play may be viewed, for instance, according to the viewing features described with reference to FIG. 12 later.

Figure 13:
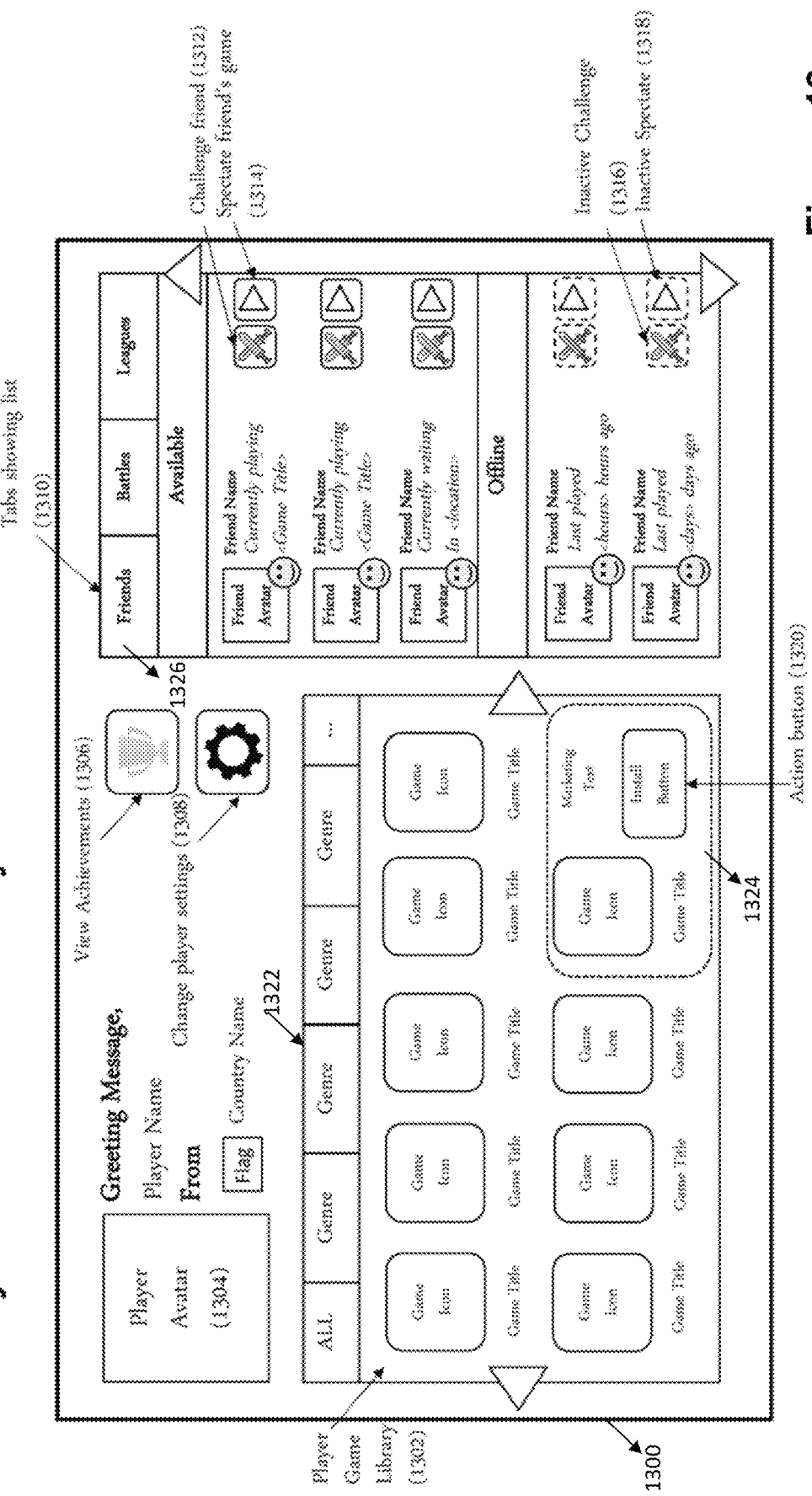
FIG. 13 illustrates an event interface according to an example of the present disclosure.

FIG. 13 illustrates an example of an event interface 1300 provided by the platform. The event interface 1300 comprises a player's game library 1302. The player's game library 1302 comprises a plurality of mobile game applications (represented by game icons in FIG. 13) for selection.

There may be tabs 1322 provided to select between different genres of games.

Player details such as player name, player greeting message, player country and flag picture, player avatar 1304 and the like may be shown in the event interface 1300. Achievements of the player, for example, number of trophies/past battles won, score in past game events, etc. may be viewed by selecting a "view achievements" button 1306. Player's settings such as the player's details shown may be changed by selecting a button 1308 to change player settings.

There may be present a marketing/promotion section 1324 where a new mobile game application is promoted according to a prediction/determination made by A.I. In the present example, the A.I. model utilised for such prediction/determination is trained from data provided to learn about the player's preferences so as to enable it to promote a game that the player may like. This A.I. model is separate from the model that is described earlier for image categorization. The training/deployment of this A.I. model can be the same as what was described earlier in the training/deployment of A.I. An install button 1320 is provided in the marketing/promotion section 1324 for the player to download and install the mobile game application for running on the platform if the player chooses to do so.

The event interface 1300 comprises a plurality of tabs 1310 selectable to show a list of friends, battles or leagues. The tab 1310 displayed in FIG. 13 is a friends tab 1326 showing a list of friends. In the present example, each smiley face shown is a friend icon and an indication that the listed player or user is a friend. The battles tab would be described later with reference FIG. 16 later. The leagues tab would be described later with reference to FIG. 17 later. In the friends tab 1326, each friend's name, avatar, and game title currently playing for friends that are available to participate in events are shown. For friends that are unavailable, the number of hours from the last time that each unavailable friend played is displayed. All these friends are also users of the platform providing the event interface 1300 and are linked up via the platform run on each of the friends' user devices. Each platform on each user device can be required to link up to one or more servers to in order to be able to link up the friends and show them on the event interface 1300.

Figure 14:
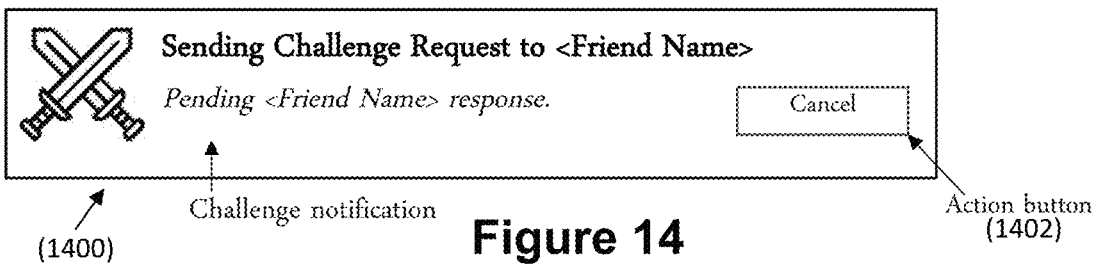
FIG. 14 illustrates a challenge notification when a challenge request to play a single player versus single player game is sent to a selected player.

For each available friend displayed, there is a corresponding challenge button 1312 that may be selected to send a challenge request to the friend to play a single player versus single player game. FIG. 14 shows an example of such challenge request or notification 1400. The challenge request 1400 has an action button 1402 to be selected if the challenge request 1400 is to be cancelled. Turning back to FIG. 13, there is also a corresponding button 1314 to spectate a friend's live or real-time game in progress if he or she is currently playing a game.

For each unavailable friend displayed, the corresponding challenge button 1316 displayed would be inactive and cannot be selected to send a challenge request to the friend to play a single player versus single player game. The corresponding button 1318 to spectate a friend's live or real-time game in progress is also inactive and cannot be selected.

Figure 15:
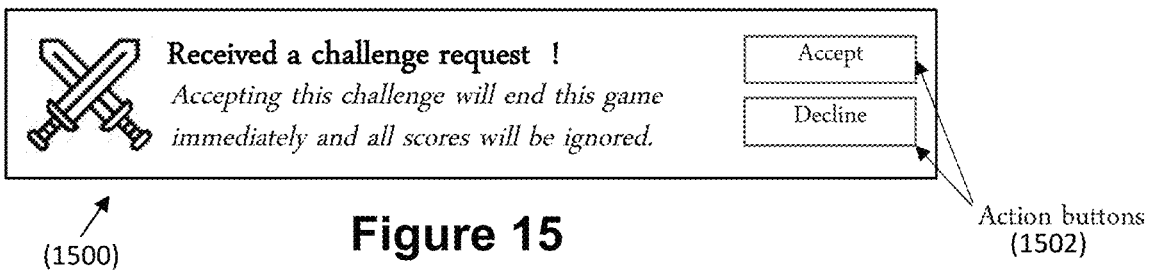
FIG. 15 illustrates a challenge request received by a player to play a single player versus single player game.

With reference FIG. 15, if a friend receives a challenge request 1500 for a single player versus single player game, the platform of the friend's user device will show it. The challenge request 1500 comprises actions buttons 1502 to accept or decline the challenge request 1500. In the present example, if the friend accepts the challenge request, a game in which the friend is playing may end immediately and all scores gained in the current game play may be ignored or lost. After accepting the challenge request 1500, a game selection interface (not shown in the Figures) may show up to decide which game to be played. The friend who accepted the challenge and the challenger may communicate with each other via a messaging interface provided in the game selection interface.

Figure 16:
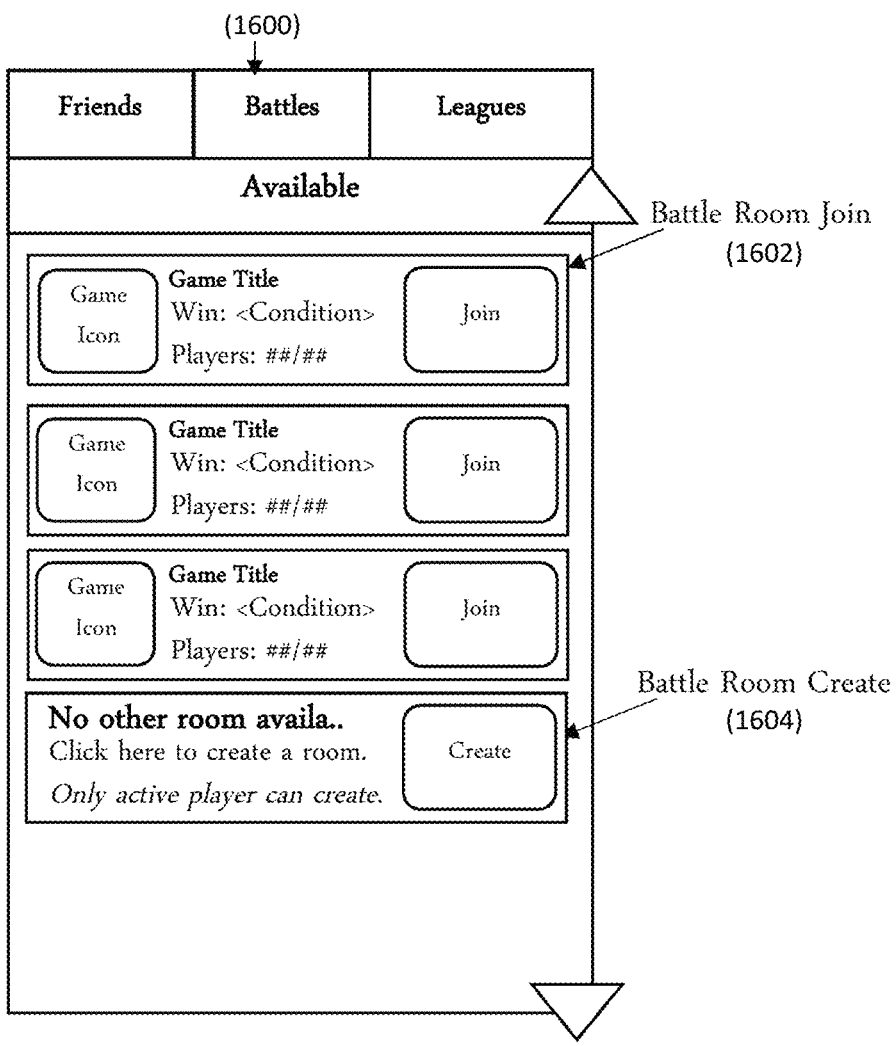
FIG. 16 illustrates a battle game tab of an event interface according to an example of the present disclosure.

FIG. 16 shows the battles tab 1600 provided in the event interface 1300 of FIG. 13. After battles tab 1600 is selected, one or more battle rooms available for selection by a player to join would be displayed. A game icon representing the game to be played would be displayed with each battle room. Each battle room has a join button 1602 for selection. Each battle room displayed indicates total number of players already joined and the player number limit. A win condition is also stated for each battle room. For instance, the winners may be players who manage to obtain more than a certain score. Battle rooms that are currently "play in progress" (not shown in FIG. 16) can be shown in the battles tab 1600 as well. Furthermore, a battle room creation button 1604 is provided in the battles tab 1600 to enable a player to create a battle room.

Figure 18:
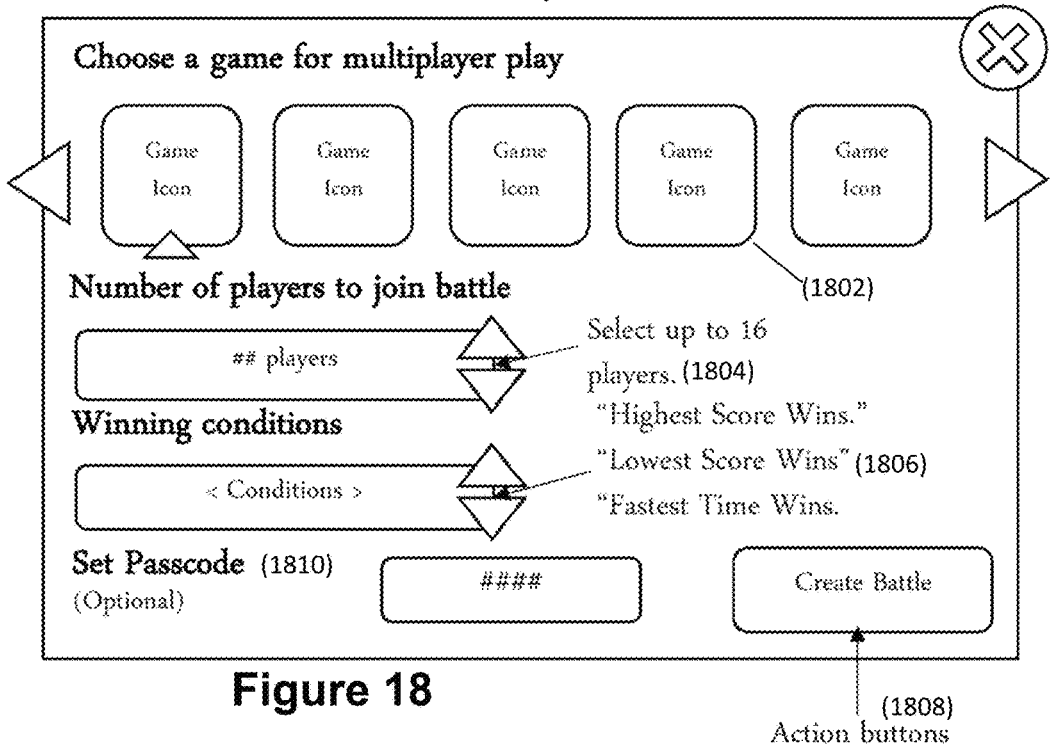
FIG. 18 illustrates a game battle room set up interface accessible from the battle game tab of FIG. 16.

In the present example, after the battle room creation button 1604 is selected, the player's game library 1302 shown in the event interface 1300 would be replaced by a battle room set up interface 1800 shown in FIG. 18. The battle room set up interface 1800 comprises a game selection section 1802, which can be a scroll bar comprising selectable game icons of different games. There is present a section 1804 for selecting number of players to join in the game battle, which may for instance be capped at a maximum of 16 players. There is present a section 1806 for indicating winning conditions, which may include selectable options such as "highest score wins", "lowest score wins" or "fastest time wins". An optional passcode 1810 may be set to make the battle room private and only opened for players with the passcode 1810 to join. A create battle button 1808 can be selected to create a battle room with the selections and entries made in the battle room set up interface 1800.

Figure 19:
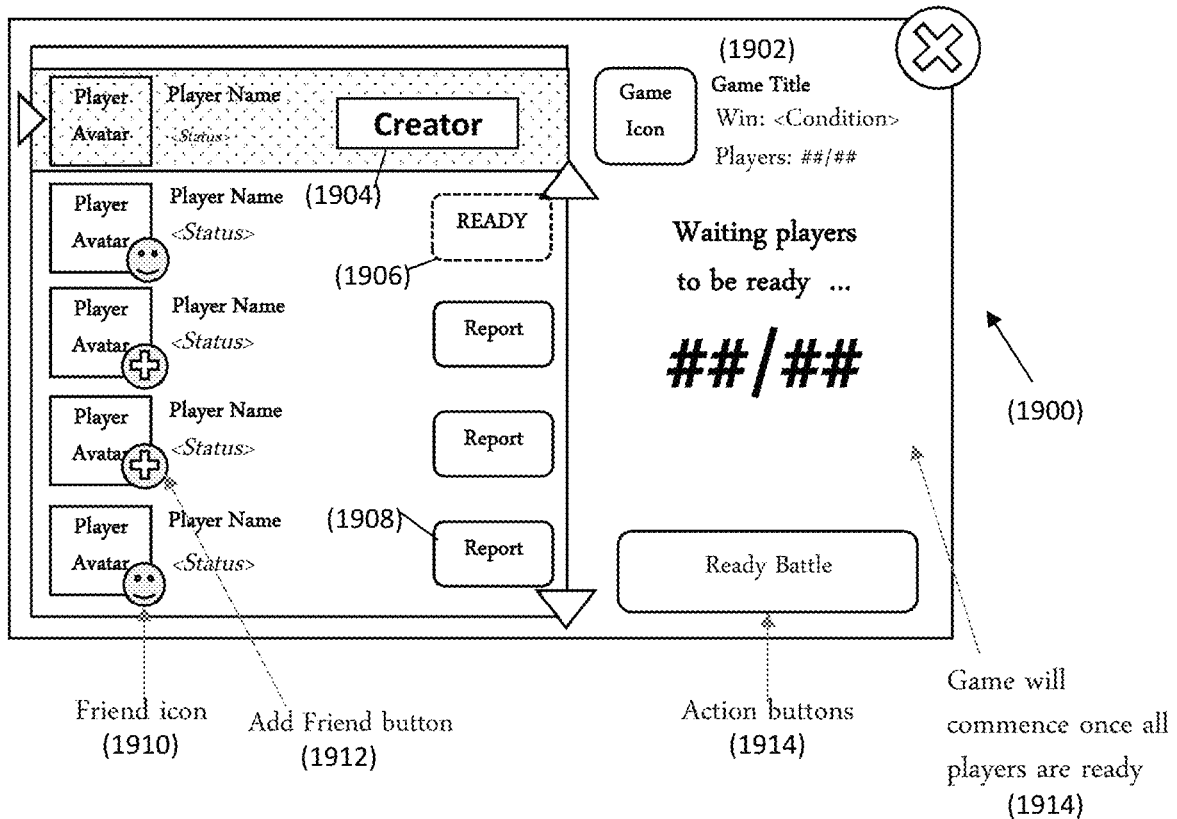
FIG. 19 illustrates a game battle room status review interface available after a battle room is set up.

In the present example, after the create battle button 1808 is selected, the battle room set up interface 1800 would be replaced by a battle room registration status interface 1900 shown in FIG. 19. A battle room available for players to join will appear in the respective battles tabs (for example, battles tab 1600 of FIG. 16) of all players using a similar platform that is connected up and providing the same battles tabs (i.e. battles tab 1600 of FIG. 16) feature on their user devices. The battle room registration status interface 1900 shows the player or creator who created the battle room along with the creator's avatar. There is present a panel 1902 displaying the game selected in the battle room set up interface 1800 to be played and the corresponding game icon and the win condition selected in the battle room set up interface 180. The panel 1902 also shows the number of players that has already participated and the maximum number of players that can participate, which was selected in the battle room set up interface 180 previously. A list of more than one players along with their player avatars and online statuses would be shown in the battle room registration status interface 1900. Each player in the list is available for the battle room creator to send a battle game invitation. The more than one players may include all the players currently detected to be playing the selected game. There might be some players who have previously been added as a friend of the creator. For these friends, a friend icon 1910 such as a smiley face may be tagged to the player avatar. For players whom are not friends with the creator, there is an add friend button 1912 available for the creator to add the player as a friend. For each player that has joined the created battle room through the respective battles tab displayed on his or her user device, a "ready" status 1906 would be indicated adjacent to the player name, avatar and online status. For each player who has not joined the created battle room, a report button 1908 is shown instead. The report button 1908 can be selected to send a battle invitation to the player.

Figure 20:
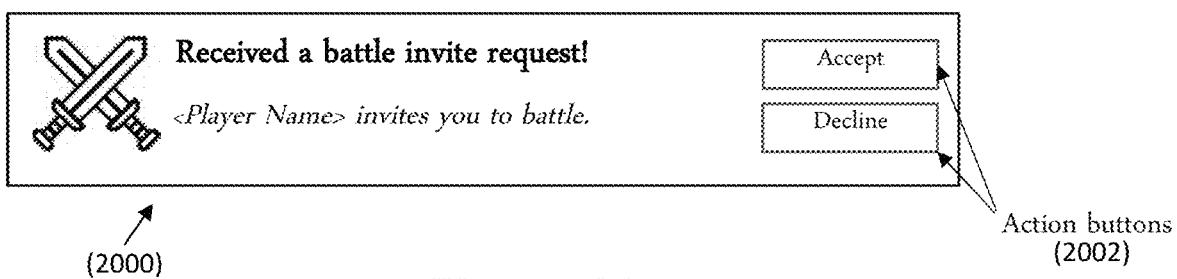
FIG. 20 illustrates an example of a game battle invitation request sent to players during a battle room set up.

After selecting the report button 1908 of FIG. 19 for a particular player, a battle invitation 2000 shown in FIG. 20 is received by the player. There are action buttons 2002 for the player to accept or decline the battle invitation or request 2000.

Figure 17:
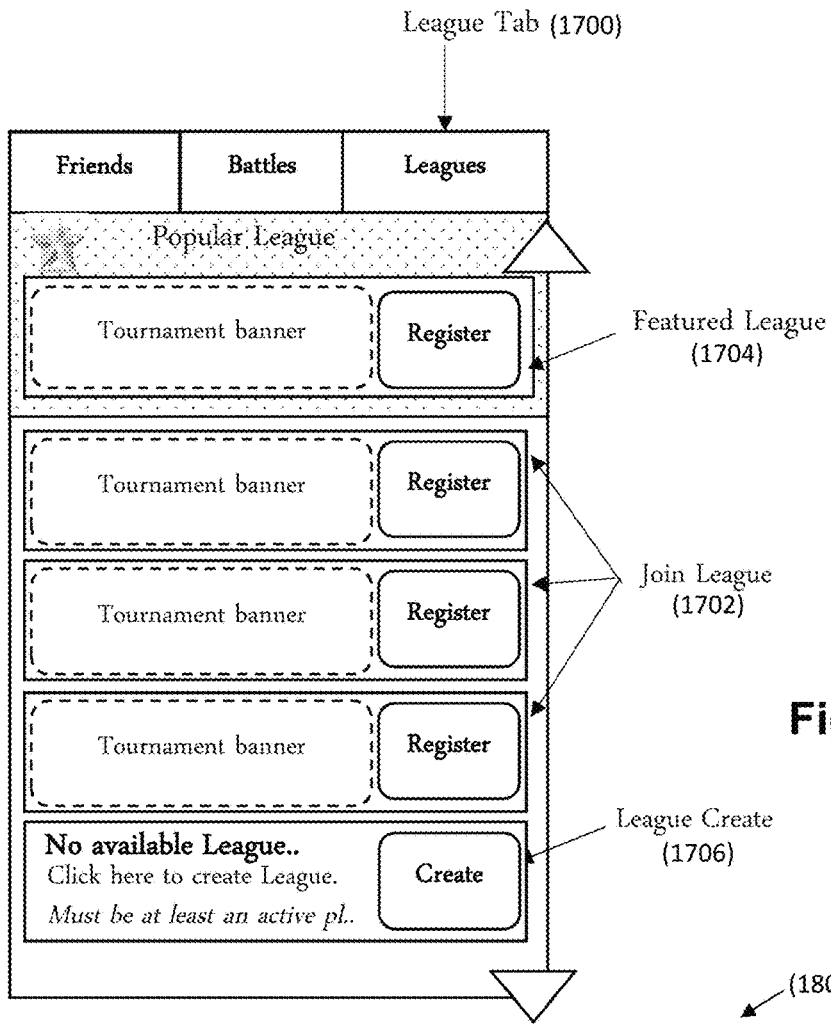
FIG. 17 illustrates a game league tab of an event interface according to an example of the present disclosure.

FIG. 17 shows details of the leagues tab 1700 provided in the event interface 1300 of FIG. 13. After the leagues tab 1700 is selected, a list of one or more leagues 1702 available for selection by players to register would be displayed. A register button is provided for joining each listed league. A tournament banner representing a game to be played accompanies each listed league. One or more popular leagues 1704 that is featured may be displayed in the leagues tab 1700 for joining. Leagues currently in progress (not shown in FIG. 17) can be shown in the leagues tab 1700 as well. There is also present a league create button 1706 to enable a player to create a league.

Figure 7:
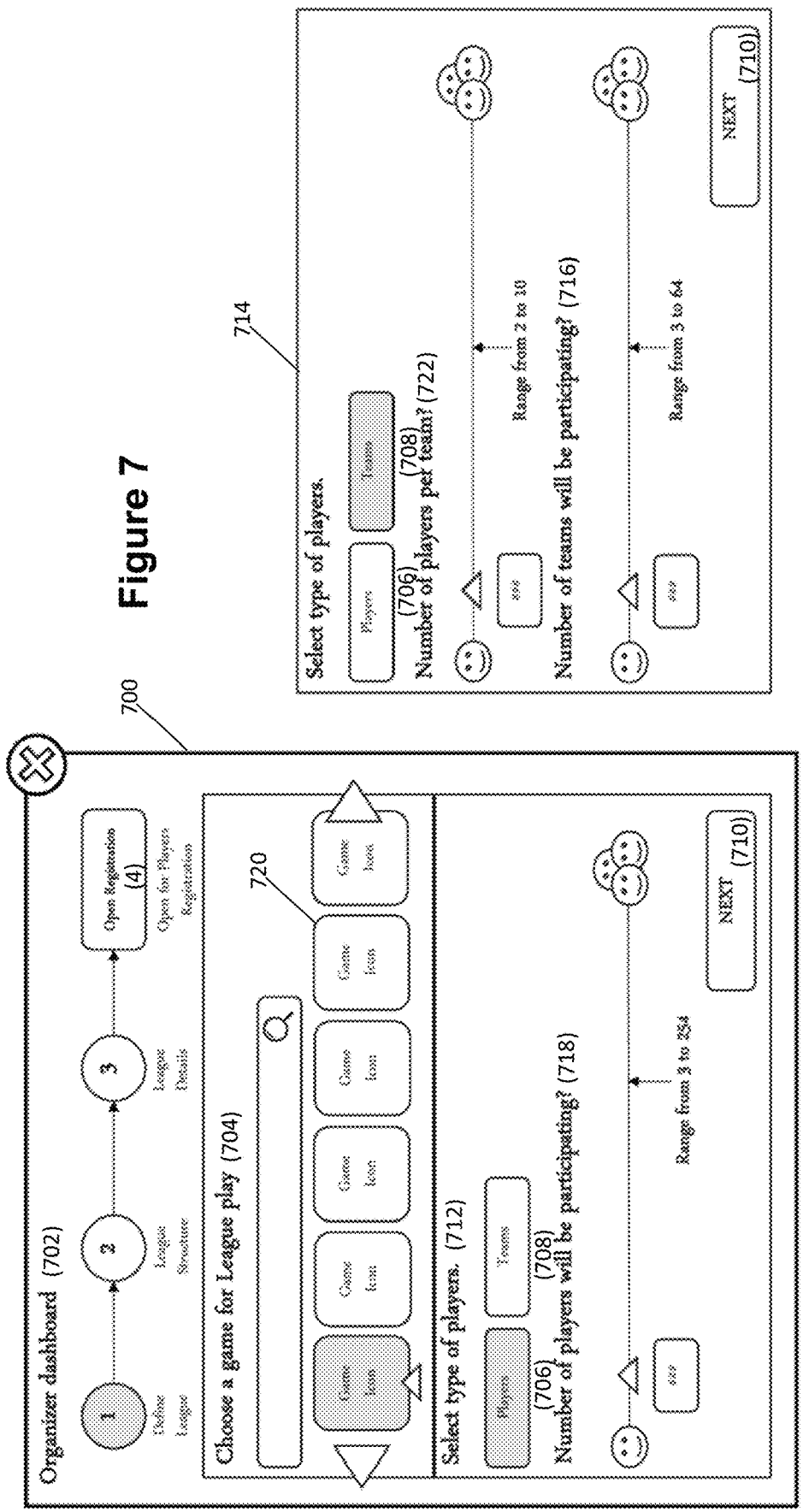
FIG. 7 illustrates a game league set up interface according to an example of the present disclosure.

FIG. 7 illustrates an example of a game league set up interface 700 that is proposed for game league match making. Such game league set up interface 700 has been observed to be currently not provided by any existing mobile device software or platform of a user device described earlier. The game league set up interface 700 can show up, for instance, after selecting the league create button 1706 in FIG. 17. There can be provided an organizer dashboard 702 comprising a progress bar with four stages 1 to 4. Stage 1 is for defining a game to be subject league play and the number of players or team. Stage 2 is for setting the league play format. Stage 3 is for setting league details. Stage 4 is to open the league play event for registration by other users of the mobile device software.

Stage 1 is displayed on the game league set up interface 700 as follows. There may include a section 704 for choosing a game for league play. There may be a plurality of game icons available in a scroll bar 720 for selecting the game for the league play. The game league set up interface 700 may also include a section 712 for selecting type of players, for instance, there can be two buttons to select individual players 706 or teams 708 (with each team comprising more than one players) to participate in the league play. When the button to select individual players 706 is selected, a panel 718 to select number of individual players to participate would appear for selecting the number of players. The number of individual players can range from 3 to 254. Once the number of individual players is selected, a next button 710 can be selected to go to stage 2. If the button to select teams 708 is selected, a panel 714 to select number of teams from would appear. The panel 714 comprises a section 722 for selecting number of players per team, which for example can range from 2 to 10, and a section 716 for selecting number of teams to participate, which for example can range from 3 to 64. Once the numbers have been selected for sections 722 and 716, the next button 710 can be selected to go to stage 2.

Figure 8:
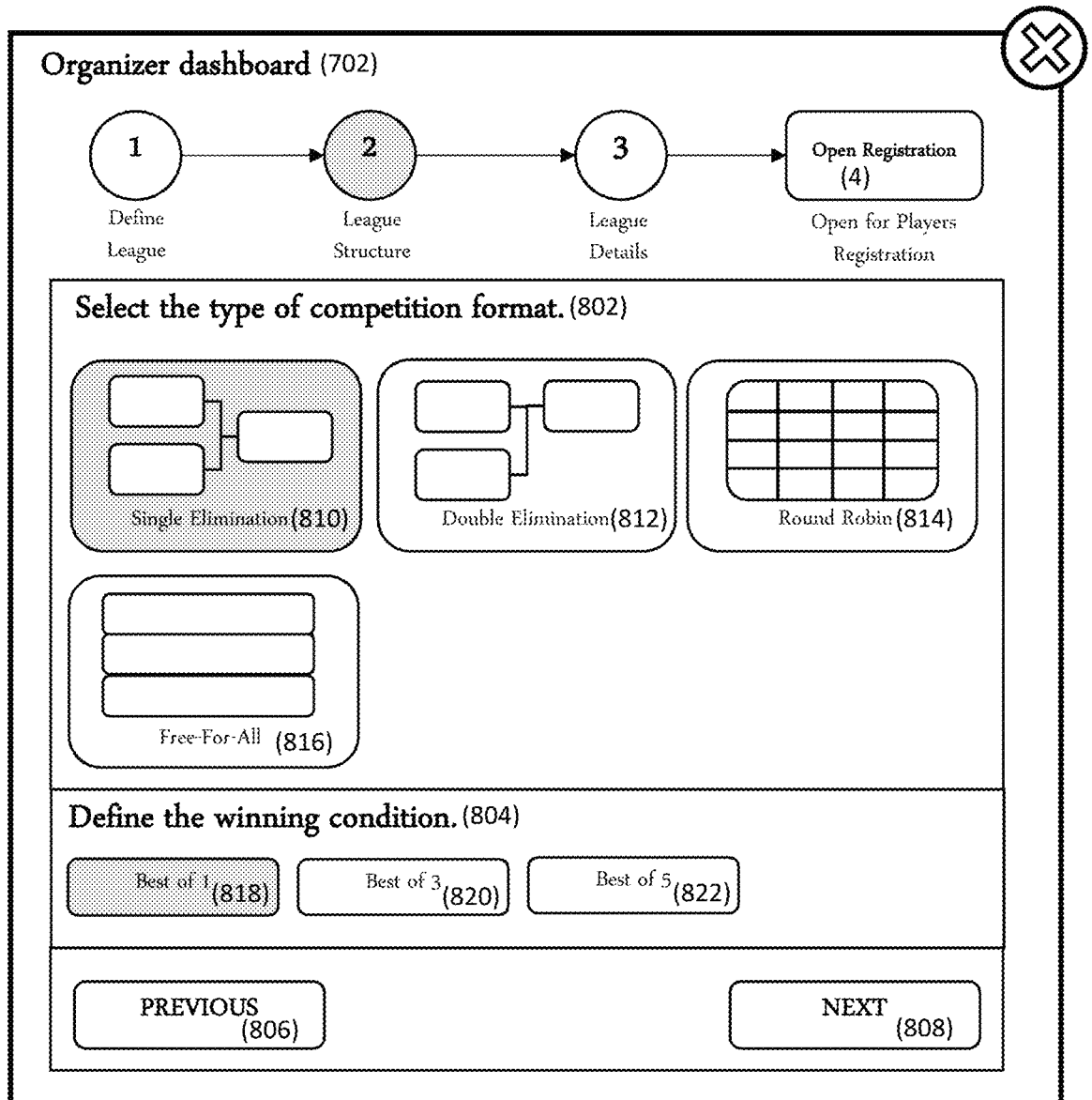
FIG. 8 illustrates competition formats and winning condition selectable on the game league set up interface of FIG. 7.

FIG. 8 shows the game league set up interface 700 of FIG. 7 displaying stage 2 of the four stages to organize a league game. In the present example, in stage 2, on the organizer dashboard 702, there is panel 802 for selecting type of competition format. There are namely four selections, Single Elimination 810, Double Elimination 812, Round Robin 814 and Free-For-All 816. There also comprise a panel 804 to define winning condition comprising the following selections best of 1 game 818, best of 3 games 820 and best of 5 games 822. After selections in panels 802 and 804 are made, a next button 808 can be selected to go to stage 3 or a previous button 806 to go back to stage 1 to edit selections.

Single Elimination 810 refers to a commonly used format for most competitions that consist of a single bracket in which players are eliminated after one loss. The league duration is typically short.

Double Elimination 812 refers to an alternative elimination format where players have to lose two matches to be eliminated. There are both Winner and Loser brackets and league duration is longer.

Round Robin 814 refers to a format where players play at least a match with all the other players. A draw match can be taken into consideration without sudden death match. Time duration per match is fixed however there are a lot of matches to complete to finish the league.

Free-For-All 816 refers to a format that has only one single round where all players will participate in the same game for the same placing. An example of such format is a racing game.

Figure 9:
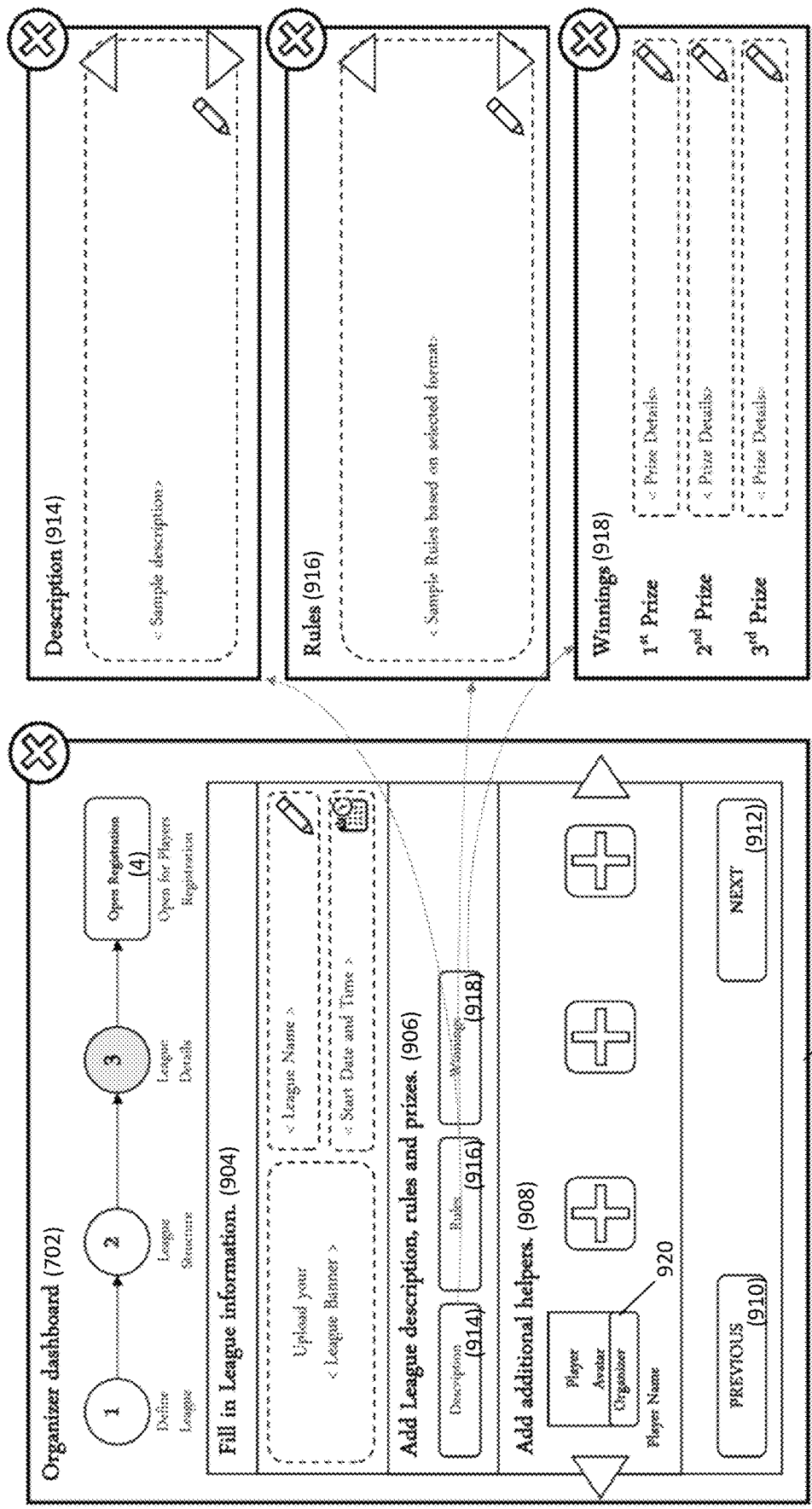
FIG. 9 illustrates league details to be entered on the game league set up interface of FIG. 7 to organise a league.

FIG. 9 shows the game league set up interface 700 of FIG. 7 displaying stage 3 of the four stages to organize a league game. In the present example, in stage 3, on the organizer dashboard 702, there is a panel 904 for filling league information such as an option to upload a league banner, provide a league name and indicate a start date and time for the league. There also comprise a panel 906 for adding league description 914, league rules 916 and state league winnings (i.e. prizes or rewards) 918. There is yet another panel 908 for adding additional helpers, which are other users, to assist the organizer 920 indicated by a player avatar and labelled as organizer in the panel 908 in the present example. The organizer 920 can be a user account holder provided with administrative rights to use the game league set up interface 700 provided on the platform to organize the league. Additional helpers may help the organizer 920 to manage or resolve issues raised by players or provide other form of assistance. After the panels 904, 906 and 908 are completed, the organizer 920 may select a next button 912 to go to stage 4 or a previous button 910 to go back to stage 2 to edit selections.

Figure 10:
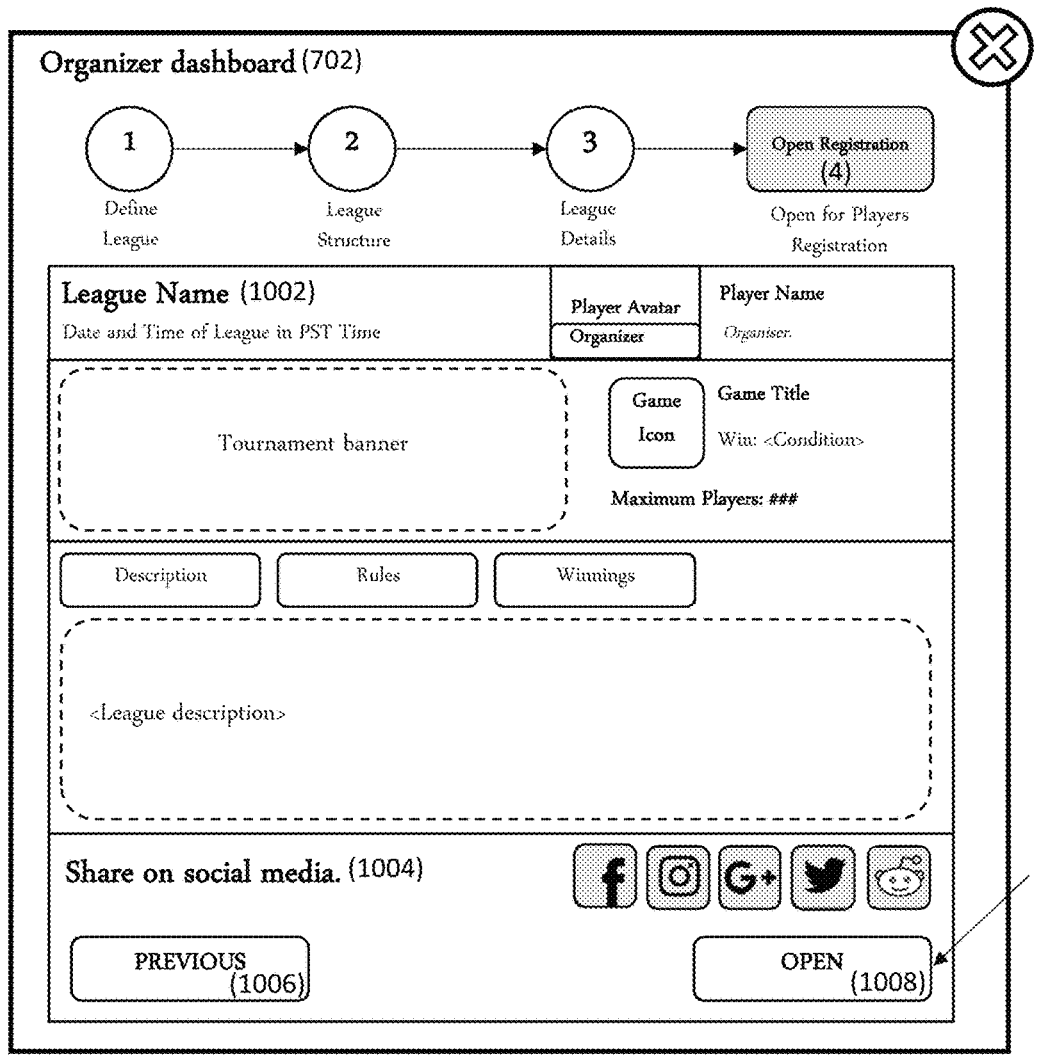
FIG. 10 illustrates the game league set up interface of FIG. 7 showing details of a league game to be opened for registration.

FIG. 10 shows the game league set up interface 700 of FIG. 7 displaying stage 4 of the four stages to organize a league game. In the present example, in stage 4, on the organizer dashboard 702, there is a panel 1002 stating some details entered/selected in earlier stages, for instance, league name, start date, time and time zone, organizer name, organizer player avatar with organizer label, uploaded league tournament banner, game icon, game title, win condition, maximum number of players, tabs for selection to view description, rules and winnings. The panel 1002 also includes a section 1004 allowing sharing of the league for player registration on social media. If the details displayed in the panel 1002 are incorrect, the organizer may select a previous button 1006 to go back to earlier stages to correct the details. If the details in the panel 1002 are correct, the organizer may click an open button 1008 to open the league for player registration through the game league set up interface 700 provided on the platform and list the league in a lobby interface that is configure for showing leagues opened for registration. The league opened for registration would be broadcasted to all platforms of the plurality of user devices for displaying on corresponding lobby interfaces of each platform.

Figure 11:
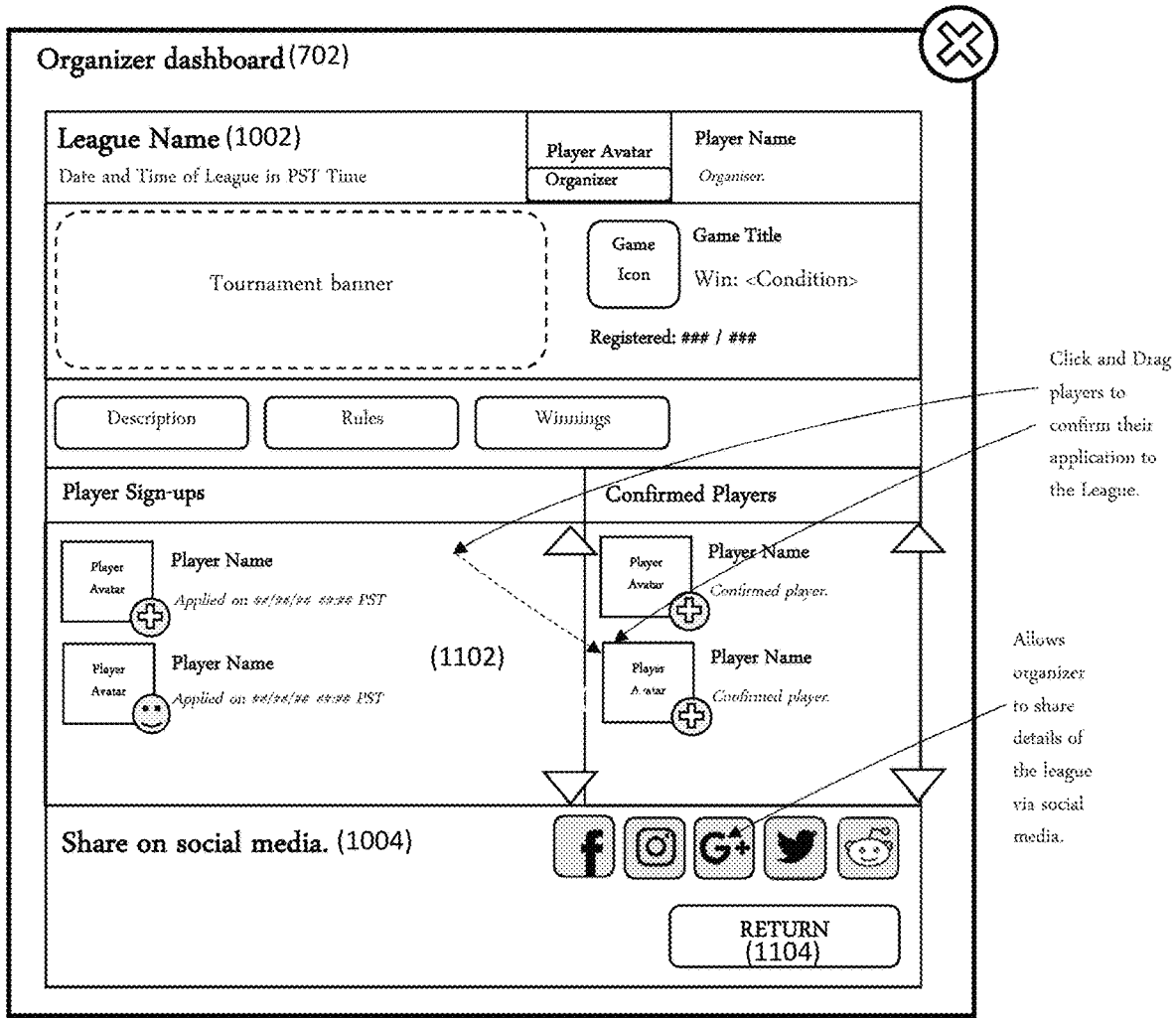
FIG. 11 illustrates the game league set up interface of FIG. 7 showing participation status of a league game opened for registration.

FIG. 11 shows the game league set up interface 700 of FIG. 7 after the organizer of the league returns to the organizer dashboard 702 to see registration status for the created league. In addition to details displayed in panel 1002 of FIG. 10 and the section 1004 of FIG. 10 for sharing via social media, the organizer dashboard 702 includes a section 1102 listing one or more player who has signed up for the league and one or more player confirmed by the organizer to participate in the league. The organizer dashboard 702 may be configured such that listed players that have signed up may be dragged and dropped into a list of confirmed players. After the organizer is done with confirmation of players, a return button 1104 may be selected to exit the registration confirmation interface provided by the game league set up interface 700.

Figure 12:
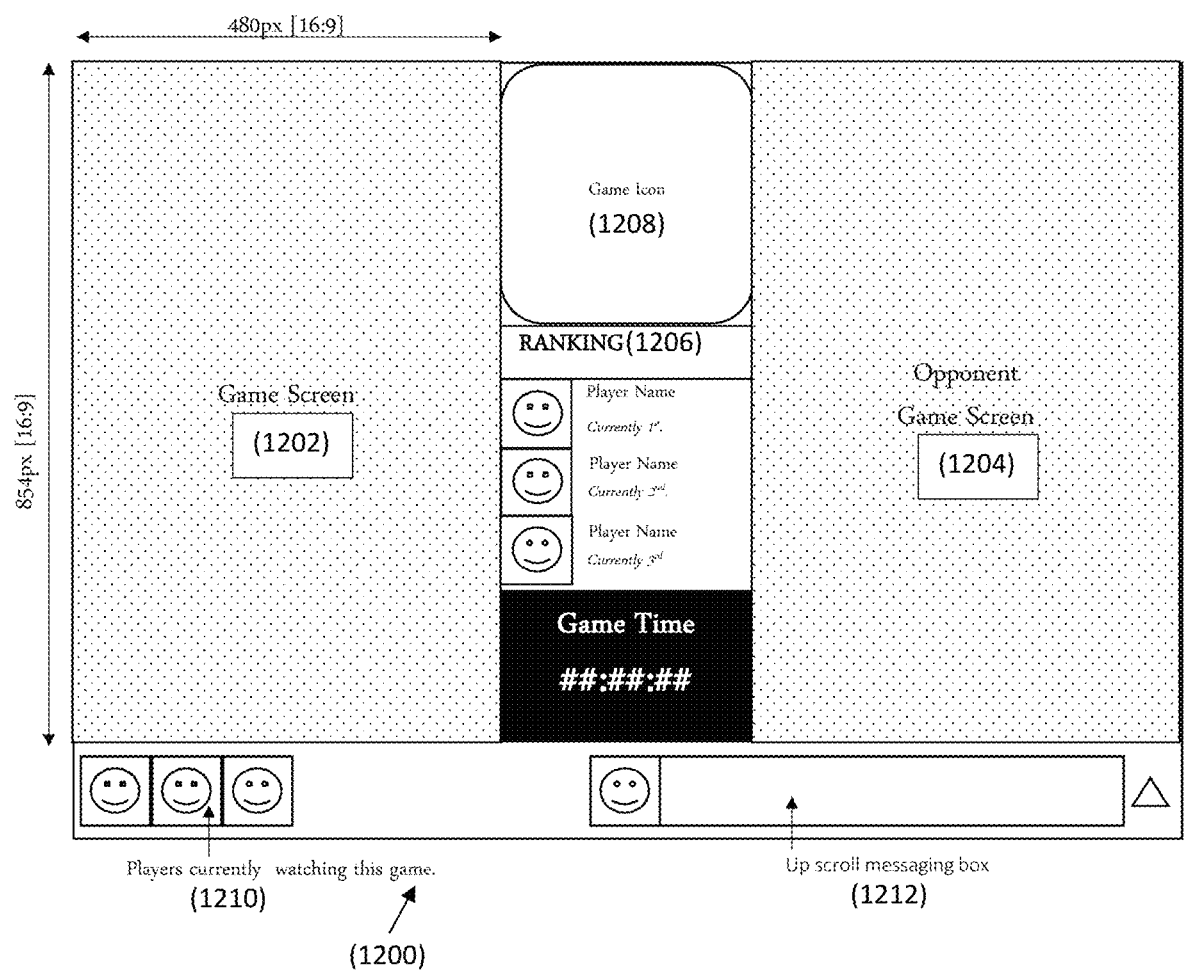
FIG. 12 illustrates a viewing interface according to an example of the present disclosure.

FIG. 12 illustrates an example of a viewing interface 1200 that may be provided by the platform of a user device described earlier or by a mobile app installed on the user device. The viewing interface 1200 comprises at least two screens 1202 and 1204. The viewing interface 1200 is configured for displaying graphics of one mobile device software operated by a first user of the user device on the screen 1202. The viewing interface 1200 is also configured for displaying graphics of one mobile device software operated by a second user of a second user device on the screen 1204. In the present example, the user device and the second user device are running the same mobile device software and the mobile device software being run is a mobile game application. The first user and the second user are opponents in a multi-player battle organized for the mobile game application. The viewing interface comprises a game icon 1208 indicative of the mobile game application that is played. The game icon 1208 is present at a centre of the viewing interface 1200. The first user is able to see himself or herself play the game on the screen 1202 and is able to see the second user play the game on the screen 1204. Below the game icon 1208 is a ranking list 1206 showing which other users or players are currently leading in the game. Specifically, player names and current position of the players are indicated in the ranking list 1206. Below the ranking list 1206 is a game time duration indicator 1214 to indicate how much play time has lapsed. At a bottom of the viewing interface 1200, there is comprised a plurality of player avatars of players 1210 currently watching a game being played by participants of the multi-player battle. Adjacent to the plurality of player avatars of players 1210 at the bottom of the viewing interface 1200 is an up scrolling messaging box 1212 for the first user to post comments viewable by players that have participated in the multi-player battle or are currently watching the game played by participants. The screen 1204 can be toggled to display another player playing the game by selecting a player entry in the ranking list 1206. In this manner, the playing progress of different users can be conveniently viewed. It has been observed that such opponent screen toggling feature through opponent selection from a displayed list is not provided in any existing mobile game applications. It should be noted that the mobile game application need not be one that already provides such multi-player battle gameplay. Such viewing interface 1200 provided by the platform can provide viewing of multi-player game battles organized through an event interface provided by the platform for mobile game applications that do not provide such multi-player battle gameplay. In another example, instead of showing up the screens 1202 and 1204 side by side, which is the case of FIG. 12, it is possible to display the screen 1202 in full screen mode and the screen 1204 is displayed as a smaller screen overlaying the full screen display of the screen 1202, or vice versa (i.e. screen 1204 is full screen and screen 1202 is smaller screen). Such configuration of this example may be regarded as picture-in-picture mode. The elements in between the screens 1202 and 1204 such as the ranking list 1206 of the earlier example may be hidden in such picture-in-picture mode and the ranking list 1206 may be called out for selecting a player's screen to be displayed in the screen 1204.

Figure 21:
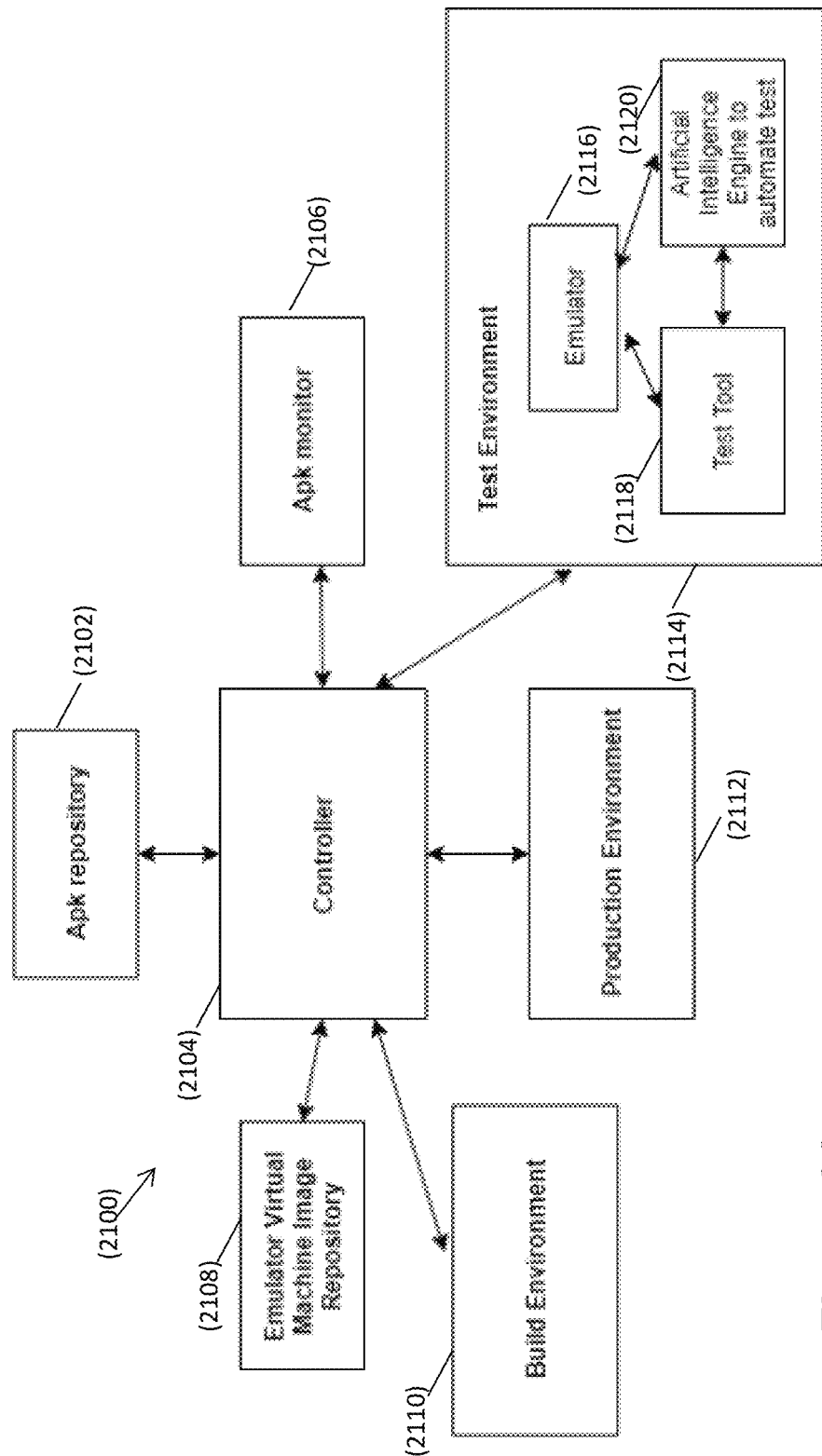
FIG. 21 illustrates an example of a setup comprising various components for testing mobile device software to support the machine learning architectures of FIGS. 4 to 6 respectively.

FIG. 21 shows an example of a setup 2100 comprising various components for testing mobile device software to support the respective machine learning architectures 400, 500 and 600 described with reference to FIGS. 4 to 6 earlier. The components comprised in the setup 2100 are described in detail as follows.

Apk Monitor 2106—This module 2106 monitors availability of new apks (i.e. .apk files), downloads the new apks if available and updates an Apk repository 2102 through help of a Controller 2104 controlling the process. Each apk file is essentially a piece of mobile device software or a Mobile App. An apk or apks described herein refer to a mobile app or apps respectively. An advantage of the Apk Monitor 2106 is to provide a solution to automatically monitor and download a new mobile device software for storage after it is released or when a new version of a piece of mobile device software is available for download.

Apk Repository 2102—The Apk Repository 2102 stores different versions of apks.

Emulator Virtual Machine Image Repository 2108—This repository 2108 stores different versions of Emulator Virtual Machine Images. Such emulator virtual machine images are required to be operable by a platform described earlier that functions as an emulator to run mobile device software. Such emulator virtual machine images refer to a mobile operating system, for instance, Android, Apple Operating System and the like. This repository 2108 also provides data relating to mapping of different versions of the Emulator Virtual Machine Images with the versions of apks. It is noted that certain versions of apks can only operate on certain versions of emulator virtual machine images.

Test Environment 2114—A Test Environment 2114 is set up with the emulator i.e. the platform 2116, a test tool 2118, and an artificial intelligence engine 2120 for automating the emulator test when new apks or new versions of apks are available. The Test Environment 2114 provides testing that is required to ensure that the new apks or new versions of the apks can run properly on the platform to be installed on user devices in the machine learning architectures 400, 500 and 600. The test tool 2118 is a test package that can be configured to simulate user inputs such as mouse clicks, keyboard entries and the like for testing the apk. The artificial intelligence engine 2120 detects change in Graphical User Interfaces displayed through help of the platform 2116 for each apk through image recognition and updates the configuration of the test tool 2118 for the apk to be tested so that the test tool 2118 is able to perform the apk testing automatically. The artificial intelligence engine 2120 can be configured to operate according to the trained computer neural network of the method described earlier that has the steps of:

running mobile device software through the platform installed on the user device;

capturing images of the mobile device software as the mobile device software is running and operated by a user;

extracting image descriptors from each image of the captured images;

processing the extracted image descriptors to generate input to a model derived from a trained computer neural network;

processing output of the model to determine a category for the captured image from which the image descriptors are extracted;

extracting one or more features present in the captured image according to the predetermined one or more features to be extracted for the category; and processing the extracted one or more features to determine a score, ranking or level tied to the user against scores, rankings or level of other users of the same mobile device software in the case if the category relates to scoring, ranking or levelling.

As the present example relates to testing, there would be a further step of processing the extracted one or more features to determine a state of the mobile device software to troubleshoot the mobile device software if the category relates to software abnormality in addition to the steps of the method indicated above. The Test Environment 2114 advantageously provides a solution to automatically test new mobile device software or a new version of a piece of mobile device software to check whether it would work on an old or new version of the platform.

Build Environment 2110—The Build Environment 2110 is set up to allow building of an emulator installer which comprises of the virtual machine image. Such emulator installer will be used to facilitate installing updated versions of the platform 2116 installed on user devices. Such updated versions of the platform 2116 contain updated versions of the emulator virtual machine images required for running new or new versions of mobile apps.

Production Environment 2112—The Production environment 2112 allows public users to be able to retrieve the newly built emulator installers built by the Build Environment 2110.

Controller 2104—This controller 2104 coordinates the processing required by the various components described above.

An example of a system for implementing the machine learning architecture 500 or 600 described earlier with reference to FIGS. 5 and 6 will now be described with reference to FIG. 22.

In this example, the system 2200 includes one or more apparatuses 2230, a communications network 2250, and one or more servers 2240 (i.e. it can be one central server or a cluster/plurality of servers). In some embodiments, the one or more servers 2240 can be administered by an entity which aggregates mobile device software for distribution to personal computers. In some embodiments, the one or more servers 2240 can be administered by an entity which distributes their own proprietary mobile device software.

The communications network 2250 can be of any appropriate form, such as the Internet and/or a number of local area networks (LANs). The configuration shown in FIG. 22 is for the purpose of example only, and in practice the apparatus 2230 and the one or more servers 2240 can communicate via any appropriate mechanism, such as via wired or wireless connections, including, but not limited to mobile networks, private networks, such as an 802.11 network, the Internet, LANs, WANs, or the like, as well as via direct or point-to-point connections, such as Bluetooth, or the like.

Apparatus 2230

Figure 23:
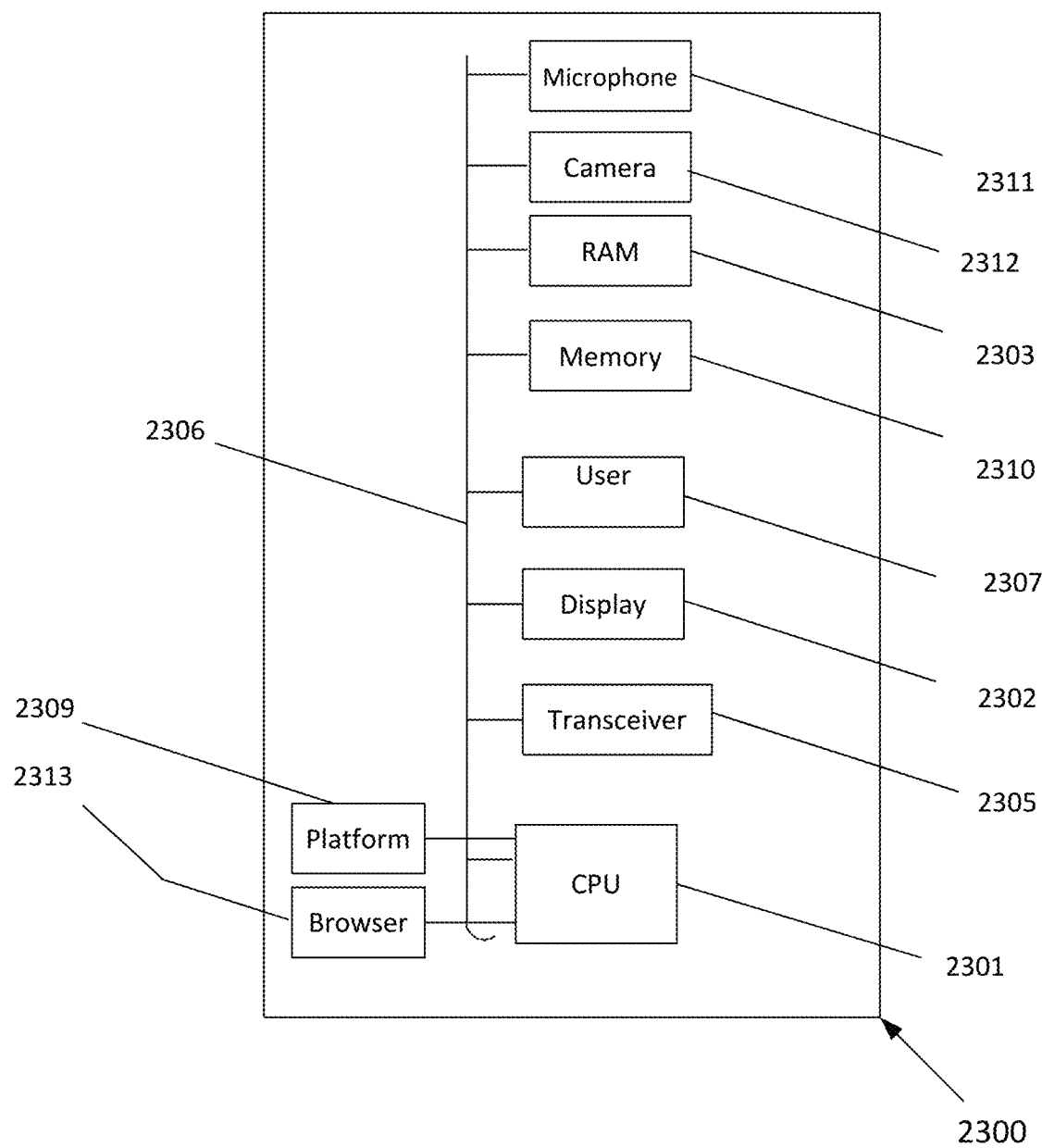
FIG. 23 is a schematic diagram showing components of an example apparatus of the system shown in FIG. 22.

The apparatus 2230 of any of the examples herein described in the present disclosure may be the user device described earlier, which can be a personal computer (such as a desktop, a notebook, and the like), a mobile device (such as smartphone, mini-tablet, and the like), a hybrid of the aforementioned (such as a portable laptop, tablet, and the like), smart TV, video game console, and the like. An example of the apparatus 2230 is the apparatus 2300 is shown in FIG. 23. As shown, the apparatus 2300 includes the following components in electronic communication via a bus 2306:

1. a display 2302;
2. non-volatile memory 2310;
3. random access memory ("RAM") 2303;
4. N processing components 2301 ("one or more processors");
5. a transceiver component 2305 that includes N transceivers;
6. user controls 2307;
7. optionally, image capturing components 2312; and
8. optionally, audio signal capturing components 2311.

In one example, the apparatus can be configured to run the A.I. prediction/determination (e.g. for image categorization) described with reference to earlier figures of the present disclosure. In this case the one or more servers 2240 may or may not need to have the A.I. prediction/determination features.

Although the components depicted in FIG. 23 represent physical components, FIG. 23 is not intended to be a hardware diagram; thus many of the components depicted in FIG. 23 may be realized by common constructs or distributed among additional physical components. Moreover, it is certainly contemplated that other existing and yet-to-be developed physical components and architectures may be utilized to implement the functional components described with reference to FIG. 23.

The display 2302 generally operates to provide a presentation of graphical content (e.g. graphical contents of the mobile device software, the one or more links, announcements and/or advertisements herein described) to a user, and may be realized by any of a variety of displays (e.g., CRT, LCD, HDMI, micro-projector and OLED displays). And in general, the non-volatile memory 2310 functions to store (e.g., persistently store) data and executable code including code that is associated with the functional components of a browser component 613 and applications, and in one example, a platform 2309 for running mobile device software. In some embodiments, for example, the non-volatile memory 2310 includes bootloader code, modem software, operating system code, file system code, and code to facilitate the implementation of one or more portions of the platform 2309 as well as other components well known to those of ordinary skill in the art that are not depicted for simplicity.

In many implementations, the non-volatile memory 2310 is realized by flash memory (e.g., NAND or NOR memory), but it is certainly contemplated that other memory types may be utilized as well. Although it may be possible to execute the code from the non-volatile memory 2310, the executable code in the non-volatile memory 2310 is typically loaded into RAM 2303 and executed by one or more of the N processing components 2301.

The N processing components 2301 (or "one or more processors") in connection with RAM 2303 generally operate to execute the instructions stored in non-volatile memory 2310 to effectuate the functional components. As one skilled in the art (including ordinarily skilled) will appreciate, the N processing components 2301 may include a video processor, modem processor, DSP, graphics processing unit (GPU), and other processing components. In some implementations, the processing components 2301 are configured to determine a type of software activated on the apparatus 2300.

The transceiver component 2305 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks. In some implementations, the communication of the transceiver component 2305 with communication networks enables a location of the apparatus 2300 to be determined.

In some implementations, the user controls 2307 are defined in the map of controls herein described. The image capturing components 2312 and the audio signal capturing components 2311 that are optionally available can also be utilised to input user controls, as defined in the map of controls.

One or More Servers 2240

Figure 22:
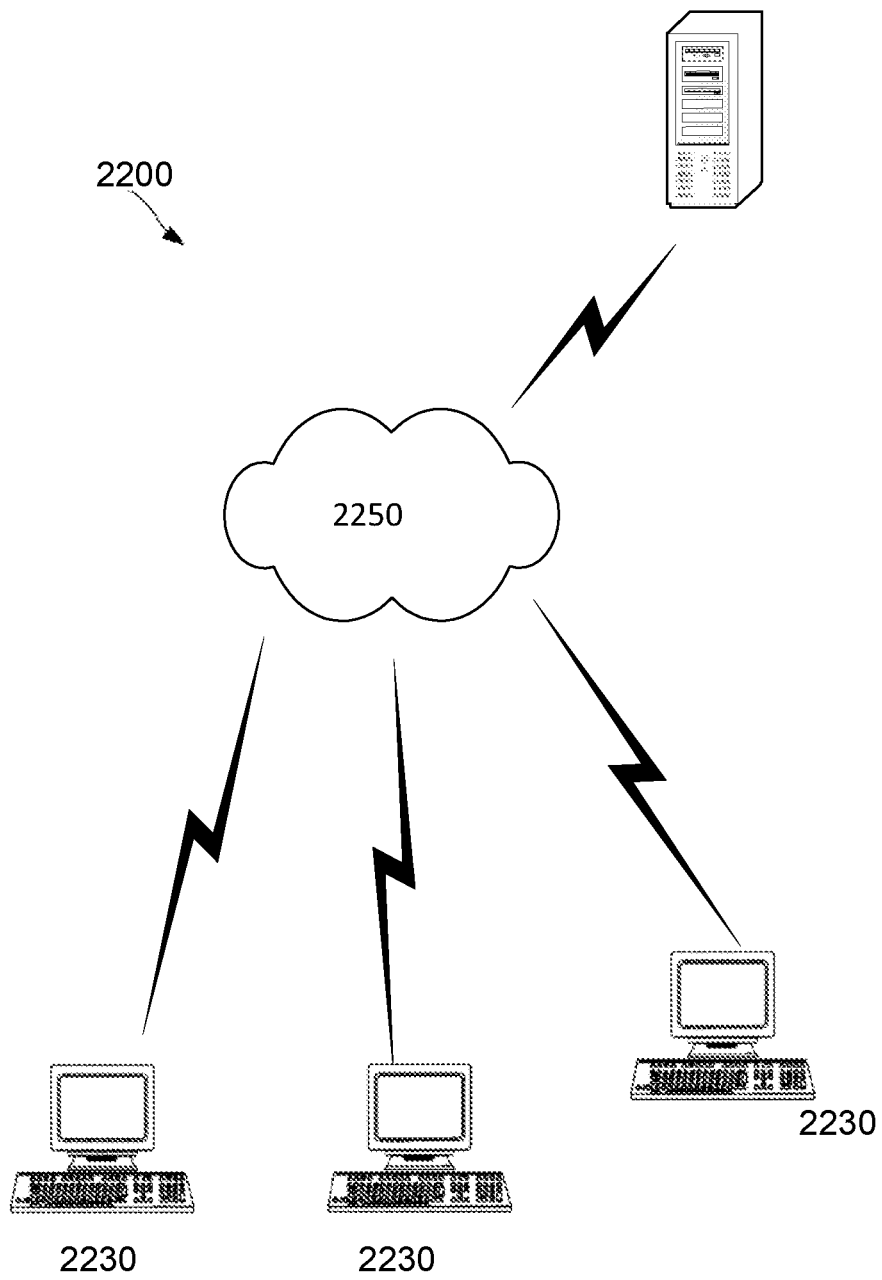
FIG. 22 is a schematic diagram of an example of a system that may be adopted to implement the machine learning architecture of FIG. 5 or 6.
Figure 24:
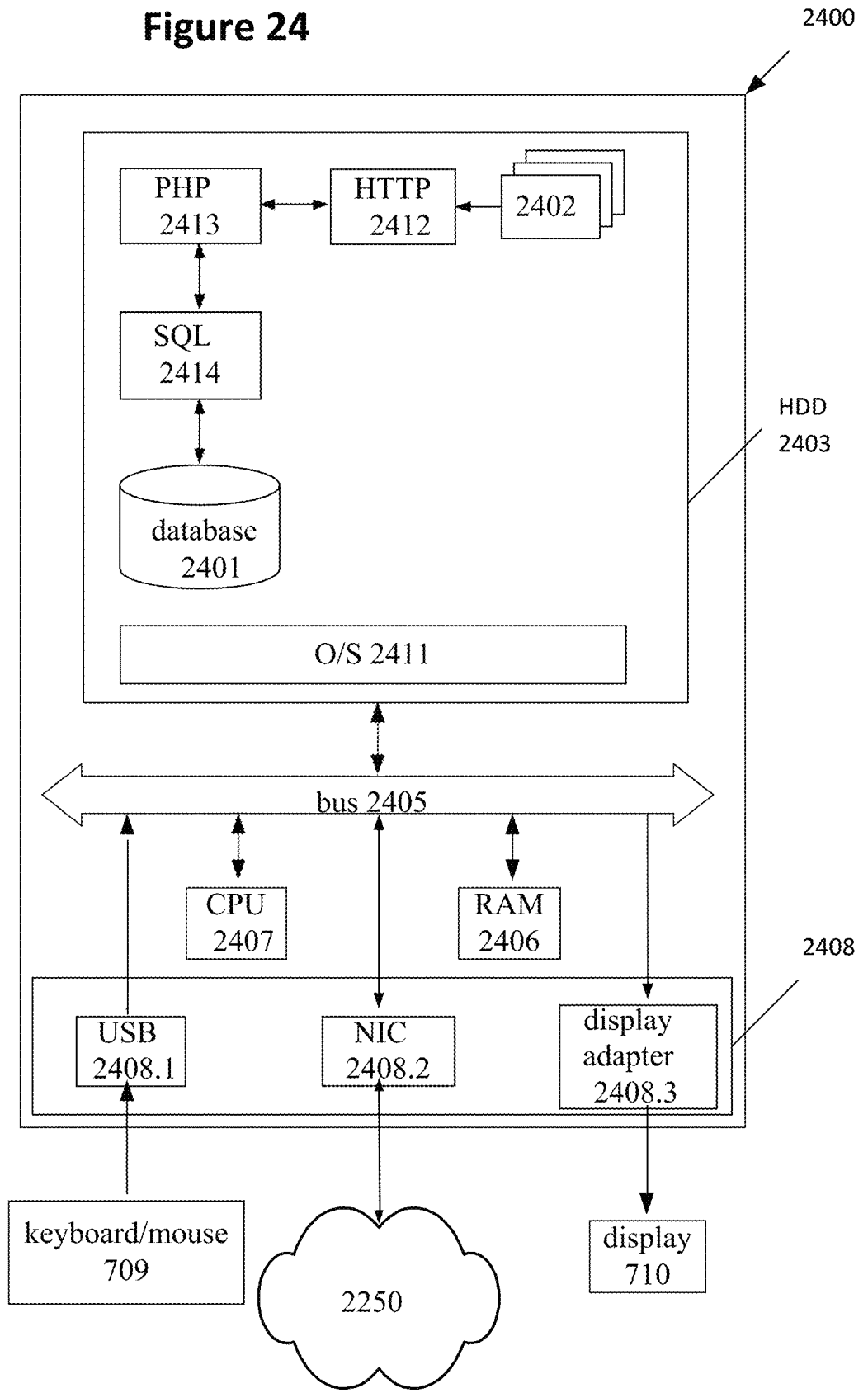
FIG. 24 is a schematic diagram showing components of an example server of the system shown in FIG. 22.

The one or more servers 2240 in FIG. 22 of any of the examples herein described in the present disclosure may each be formed of any suitable processing device, and an example of one such suitable device is shown in FIG. 24.

In one example, the one or more servers 2240 can be configured to run the A.I. prediction/determination (e.g. for image categorization) and clustered like in FIG. 6. In this case, the apparatus 2230 may or may not need to have the A.I. prediction/determination features.

In this example, a processing device is provided by a computing system 2400 in communication with a database 2401, as shown in FIG. 24. The computing system 2400 is able to communicate with the personal computers 2230, and/or other processing devices, as required, over a communications network 2250 using standard communication protocols.

The components of the computing system 2400 can be configured in a variety of ways. The components can be implemented entirely by software to be executed on standard computer server hardware, which may comprise one hardware unit or different computer hardware units distributed over various locations, some of which may require the communications network 2250 for communication. A number of the components or parts thereof may also be implemented by application specific integrated circuits (ASICs) or field programmable gate arrays.

In the example shown in FIG. 24, the computing system 2400 is a commercially available server computer system based on a 32 bit or a 64 bit Intel architecture, and the processes and/or methods executed or performed by the computing system 2400 are implemented in the form of programming instructions of one or more software components or modules 2402 stored on non-volatile (e.g., hard disk) computer-readable storage 2403 associated with the computing system 2400. At least parts of the software modules 2402 could alternatively be implemented as one or more dedicated hardware components, such as application-specific integrated circuits (ASICs) and/or field programmable gate arrays (FPGAs).

The computing system 2400 includes at least one or more of the following standard, commercially available, computer components, all interconnected by a bus 2405:
1. random access memory (RAM) 2406;
2. at least one computer processor 2407, and
3. external computer interfaces 2408:
   a. universal serial bus (USB) interfaces 2408.1 (at least one of which is connected to one or more user-interface devices, such as a keyboard, a pointing device (e.g., a mouse 2409 or touchpad),
   b. a network interface connector (NIC) 2408.2 which connects the computing system 2400 to a data communications network, such as the Internet 2250; and
   c. a display adapter 2208.3, which is connected to a display device 2410 such as a liquid-crystal display (LCD) panel device.

The computing system 2400 may include one or more of a plurality of standard software modules, including:
1. an operating system (OS) 2411 (e.g., Mac, Linux or Microsoft Windows®);
2. web server software 2412 (e.g., Apache, available at http://www.apache.org);
3. scripting language modules 2413 (e.g., personal home page or PHP, available at http://www.php.net, or Microsoft ASP, C sharp, or javascript); and
4. structured query language (SQL) modules 2414 (e.g., MySQL, available from http://www.mysql.com), which allow data to be stored in and retrieved/accessed from an SQL database.

Together, the web server 2412, scripting language 2413, and/or SQL modules 2414 provide the computing system 2400 with the general ability to allow users of the Internet 2250 with standard computing devices equipped with standard web browser software to access the computing system 2400 and in particular to provide data to and receive data from the database 2401 (for example, data of mobile device software).

The boundaries between the modules and components in the software modules 2402 are exemplary, and alternative embodiments may merge modules or impose an alternative decomposition of functionality of modules.

Each of the steps of the processes performed by the computing system 2400 may be executed by a module (of software modules 2402) or a portion of a module. The processes may be embodied in a non-transient machine-readable and/or computer-readable medium for configuring a computer system to execute the method. The software modules may be stored within and/or transmitted to a computer system memory to configure the computing system 2400 to perform the functions of the module.

The computing system 2400 normally processes information according to a program (a list of internally stored instructions such as a particular application program and/or an operating system) and produces resultant output information via input/output (I/O) devices 2408.

Typically, the system 2200 shown in FIG. 22 is illustrative, and can be used for carrying out the method described in the present disclosure. Data processing can be done respectively at the personal computers 2230 and the one or more servers 2240, or the data processing can be shared by the personal computers 2230 and the one or more servers 2240.

The programs, applications and software present in the one or more systems, apparatuses, and servers of FIGS. 22, 23 and/or 24 may be supplied to a user encoded on a data storage medium such as a CD-ROM, on a flash memory carrier, solid state drive or a Hard Disk Drive, and that may be read using a corresponding data storage medium reader. The programs, applications and software may be downloaded from a data network (e.g. Internet, Intranet etc.). The programs, applications and software are read and controlled in its execution by the respective processors of the apparatus 2230, and the one or more servers 2240. Intermediate storage of program data may be accomplished using Random Access Memory. In more detail, the one or more of the programs, applications and software may be stored on any non-transitory machine- or computer-readable medium. The machine- or computer-readable medium may include storage devices such as magnetic or optical disks, memory chips, or other storage devices suitable for interfacing with a general purpose computer or a mobile device such as a mobile smartphone, laptop, notebook, and the like. The programs, applications and software when loaded and executed on a general-purpose computer or apparatus effectively results in the implementation of the steps of the method described herein with respect to the Figures of the present disclosure.

Examples of the present disclosure may also include apparatus and/or user device features as follows.

An apparatus for obtaining information from mobile device software, the apparatus comprises:

a memory; a processor configured to execute a program stored in the memory to operate the apparatus to: receive images of mobile device software run through a platform installed on a user device, wherein the images are captured as the mobile device software is running and operated by a user; extract image descriptors from each image of the captured images; process the extracted image descriptors to generate input to a model derived from a trained computer neural network; process output of the model to determine a category for the captured image from which the image descriptors are extracted; extract one or more features present in the captured image according to the predetermined one or more features to be extracted for the category; and process the extracted one or more features to determine a score, ranking or level tied to the user against scores, rankings or levels of other users of the same mobile device software in the case that the category relates to scoring, ranking or levelling.

The apparatus may be operable to process the extracted one or more features to determine a state of the mobile device software to troubleshoot the mobile device software if the category relates to software abnormality.

The platform may be configured to operate in an existing operating system of the user device to run the mobile device software and the existing operating system of the user device is not originally configured to run the mobile device software.

The apparatus may be operable to receive a data log of a messaging interface provided on the platform to check content in the data log to identify unacceptable content entered or uploaded by the user and to take action against the user through the platform if unacceptable content is identified.

The apparatus may be operable to: receive content of a messaging interface provided on the platform; extract features from the content of the messaging interface; input the extracted features from the content to a model derived from a trained computer neural network; and process output of the model to determine whether the content is acceptable or unacceptable.

The apparatus may be operable to determine an event for pushing to the event interface based on the determined score, ranking or level.

The apparatus may be operable to: receive user input for operating the mobile device software; convert user input into user input descriptors; and process the user input descriptors in addition to processing the extracted image descriptors to generate input to the model for the determination of the category of the image.

The mobile device software may be a mobile game application.

In a case of more than one user devices, wherein each user device may have the platform to run the mobile device software and the more than one user devices may be grouped into more than one clusters, and the apparatus may be operable as a master device to handle prediction and/or determination required by a model of a trained computer neural network for one cluster.

A user device for obtaining information from mobile device software, the user device comprises: a memory; a processor configured to execute a program stored in the memory to operate the user device to: run mobile device software through a platform installed on a user device; capture images of the mobile device software as the mobile device software is running and operated by a user; send the captured images to the apparatus as claimed in any one of claims 19 to 27 to categorise the captured images using the model and determine the score, ranking or level tied to the user against scores, rankings or levels of other users of the same mobile device software from an image of the captured images that is categorised in the category that relates to scoring, ranking or levelling.

The user device may be operable to enable, through a messaging interface provided on the platform, communication between users that run the same mobile device software on the same platform installed on a plurality of user devices.

The platform may be configured to provide an event interface to enable user participation in an event relating to the mobile device software.

The event relating to the mobile device software may be opened to users of predetermined scores, rankings or levels.

The user device may be operable to enable, through the event interface provided by the platform, user viewing of details of one or more past, present or future events relating to the mobile device software.

The details of one or more past events include video playback of event activities, or the details of one or more present events may include live video streaming of event activities.

The user device may be operable to enable, through the event interface provided by the platform, user hosting of an event relating to the mobile device software.

The user device may be operable to enable, through the event interface provided by the platform, user selection of a public event registrable by any user or private event registrable by limited users.

The platform may be configured to provide a game league set up interface for setting up a game league comprising more than one users of the mobile device software and the score, ranking or level of the more than one users is used to determine one or more winner in the game league.

The mobile device software may be a mobile game application.

The platform may be configured to provide a viewing interface, the viewing interface comprises: at least two screens, wherein a first screen is configured to display graphics of one mobile device software operated by a user; and a selection panel configured to enable selection, from a list comprising one or more users, a user so as to display graphics of the mobile device software operated by the selected user on a second screen of the at least two screens.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

While the invention has been described in the present disclosure in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

The invention claimed is:

1. A method for categorizing images of mobile device software, the method comprising:
running mobile device software through a platform installed on a user device;
capturing images of the mobile device software as the mobile device software is running and operated by a user;
extracting image descriptors from each image of the captured images;
processing the extracted image descriptors to generate input to a model derived from a trained computer neural network;
processing output of the model to determine a category for the captured image from which the image descriptors are extracted;
extracting one or more features present in the captured image according to the predetermined one or more features to be extracted for the category; and
processing the extracted one or more features to determine a score, ranking or level tied to the user against scores, rankings or levels of other users of copies of the same mobile device software in the case that the category relates to scoring, ranking or levelling,
wherein the platform is an emulator configured to operate in an existing operating system of the user device to run the mobile device software and the existing operating system of the user device is not originally configured to run the mobile device software,
wherein the mobile device software is one or more mobile applications, the platform is configured to run each mobile application, and the method comprises enabling event hosting for more than one of the mobile applications through an event interface provided by the platform.

2. The method as claimed in claim 1, the method further comprising:
processing the extracted one or more features to determine a state of the mobile device software to troubleshoot the mobile device software if the category relates to software abnormality.

3. The method as claimed in claim 1, the method further comprising enabling, through a messaging interface provided on the platform, communication between users that run mobile device software on the same platform also installed on a plurality of user devices.

4. The method as claimed in claim 3, the method further comprising checking content in a data log of the messaging interface to identify unacceptable content entered or uploaded by the user and to take action against the user through the platform if unacceptable content is identified.

5. The method as claimed in claim 4, the method further comprising:
extracting features from the content of the messaging interface;
inputting the extracted features from the content to a model derived from a trained computer neural network; and
processing output of the model to determine whether the content is acceptable or unacceptable.

6. The method as claimed in claim 1, the event relating to the mobile device software is opened to users of predetermined score, ranking or level.

7. The method as claimed in claim 1, the method further comprising enabling, through the event interface provided by the platform, user viewing of details of one or more past, present or future events relating to the mobile device software.

8. The method as claimed in claim 1, the method further comprising enabling, through the event interface provided by the platform, user hosting of an event relating to the mobile device software.

9. The method as claimed in claim 1, the method further comprising enabling, through the event interface provided by the platform, user selection of a public event registrable by any user or private event registrable by limited users.

10. The method as claimed in claim 1, the method further comprising determining an event for pushing to the event interface based on the determined score, ranking or level.

11. The method as claimed in claim 1, the method further comprising:
receiving user input for operating the mobile device software;
converting user input into user input descriptors; and
processing the user input descriptors in addition to processing the extracted image descriptors to generate input to the model for the determination of the category of the image.

12. The method as claimed in claim 1, the method further comprising:
setting up a game league comprising more than one user of the mobile device software; and
using the score, ranking or level of the more than one user to determine one or more winner in the game league.

13. The method as claimed in claim 1, the method further comprising:
displaying graphics of one mobile device software operated by a user on a first screen of a viewing interface comprising at least two screens, the viewing interface is provided by the platform; and selecting, from a list comprising one or more user, a user so as to display graphics of the mobile device software operated by the selected user on a second screen of the at least two screens.

14. The method as claimed in claim 1, the mobile device software is a mobile game application.

15. The method as claimed in claim 1, wherein in a case of more than one user device, each of the user devices has the platform to run the mobile device software and the images of the mobile device software run on each of the user devices is to be categorized by the model, the method further comprising:

grouping the more than one user device into more than one cluster, wherein image categorization for each of the more than one cluster comprising a portion of the more than one user device is handled by a master device.

16. An apparatus for obtaining information from mobile device software, the apparatus comprising:

a memory;
a processor configured to execute a program stored in the memory to operate the apparatus to:
receive images of mobile device software run through a platform installed on a user device, wherein the images are captured as the mobile device software is running and operated by a user;
extract image descriptors from each image of the captured images;
process the extracted image descriptors to generate input to a model derived from a trained computer neural network;
process output of the model to determine a category for the captured image from which the image descriptors are extracted;
extract one or more features present in the captured image according to the predetermined one or more features to be extracted for the category; and
process the extracted one or more features to determine a score, ranking or level tied to the user against scores, rankings or levels of other users of copies of the same mobile device software in the case that the category relates to scoring, ranking or levelling,
wherein the platform is an emulator configured to operate in an existing operating system of the user device to run the mobile device software and the existing operating system of the user device is not originally configured to run the mobile device software,
wherein the mobile device software is one or more mobile applications, the platform is configured to run each mobile application, and the method comprises enabling event hosting for more than one of the mobile applications through an event interface provided by the platform.

17. The apparatus as claimed in claim 16, the apparatus is operable to process the extracted one or more features to determine a state of the mobile device software to troubleshoot the mobile device software if the category relates to software abnormality.

18. The apparatus as claimed in claim 16, the apparatus is operable to receive a data log of a messaging interface provided on the platform to check content in the data log to identify unacceptable content entered or uploaded by the user and to take action against the user through the platform if unacceptable content is identified.

19. The apparatus as claimed in claim 16, the apparatus is operable to:

receive content of a messaging interface provided on the platform;
extract features from the content of the messaging interface;
input the extracted features from the content to a model derived from a trained computer neural network; and
process output of the model to de e nine whether the content is acceptable or unacceptable.

20. The apparatus as claimed in claim 16, the apparatus is operable to determine an event for pushing to the event interface based on the determined score, ranking or level.

21. The apparatus as claimed in claim 16, the apparatus is operable to:

receive user input for operating the mobile device software;
convert user input into user input descriptors; and
process the user input descriptors in addition to processing the extracted image descriptors to generate input to the model for the determination of the category of the image.

22. The apparatus as claimed in claim 16, the mobile device software is a mobile game application.

23. The apparatus as claimed in claim 16, wherein in a case of more than one user device, wherein each user device has the platform to run the mobile device software and the more than one user device are grouped into more than one cluster, wherein the apparatus is operable as a master device to handle prediction and/or determination required by a model of a trained computer neural network for one cluster.

24. The apparatus as claimed in claim 16, wherein the user device comprises:

a second memory;
a second processor configured to execute a second program stored in the second memory to operate the user device to:
run the mobile device software through the platform installed on the user device;
capture images of the mobile device software as the mobile device software is running and operated by the user; and
send the captured images of the mobile device software to the apparatus to categorize the captured images of the mobile device software using the model and determine the score, ranking, or level tied to the user against scores, rankings, or levels of other users of copies of the same mobile device software from an image of the captured images of the mobile device software that is categorized in the category that relates to scoring, ranking or levelling.

25. The user device as claimed in claim 24, the user device is operable to enable, through a messaging interface provided on the platform, communication between users that run the same mobile device software on the same platform installed on a plurality of user devices.

26. The user device as claimed in claim 24, the event relating to the mobile device software is opened to users of predetermined scores, rankings or levels.

27. The user device as claimed in claim 24, the user device is operable to enable, through the event interface provided by the platform, user viewing of details of one or more past, present or future events relating to the mobile device software.

28. The user device as claimed in claim 24, the user device is operable to enable, through the event interface provided by the platform, user hosting of an event relating to the mobile device software.

29. The user device as claimed in claim 24, the user device is operable to enable, through the event interface provided by the platform, user selection of a public event registrable by any user or private event registrable by limited users.

30. The user device as claimed in claim 24, the platform is configured to provide a game league set up interface for setting up a game league comprising more than one user of the mobile device software and the score, ranking or level of the more than one user is used to determine one or more winner in the game league.

31. The user device as claimed in claim 24, the mobile device software is a mobile game application.

32. The user device as claimed in claim 24, the platform is configured to provide a viewing interface, the viewing interface comprising:
- at least two screens, including a first screen configured to display graphics of one mobile device software operated by a user; and
- a selection panel configured to enable selection, from a list comprising one or more users, of a selected user to display graphics of mobile device software operated by the selected user on a second screen of the at least two screens.

* * * * *